(12) United States Patent
Williams et al.

(10) Patent No.: US 7,520,987 B1
(45) Date of Patent: Apr. 21, 2009

(54) SYSTEM AND APPARATUS FOR PURGING ABSORPTIVE MATERIALS USED IN THE REMOVAL OF CONTAMINATES FROM AN AQUEOUS MEDIUM

(75) Inventors: Charles S. Williams, Golden, CO (US); Scott E. Heffner, Golden, CO (US)

(73) Assignee: WRT International LLC, Wheat Ridge, CO (US)

( * ) Notice: Subject to any disclaimer, the term of this patent is extended or adjusted under 35 U.S.C. 154(b) by 27 days.

(21) Appl. No.: 11/560,205

(22) Filed: Nov. 15, 2006

Related U.S. Application Data

(60) Provisional application No. 60/737,159, filed on Nov. 15, 2005.

(51) Int. Cl.
*B01D 24/12* (2006.01)
(52) U.S. Cl. ....................... 210/291; 210/293
(58) Field of Classification Search ................ 210/189, 210/285, 287–289, 291, 293
See application file for complete search history.

(56) References Cited

U.S. PATENT DOCUMENTS

| | | | |
|---|---|---|---|
| 2,632,720 A | 3/1953 | Perry |
| 3,700,592 A | 10/1972 | Pree |
| 3,723,308 A | 3/1973 | Breck |
| 3,933,631 A | 1/1976 | Adams |
| 4,009,102 A | 2/1977 | Davis |
| 4,265,634 A | 5/1981 | Pohl |
| 4,375,568 A | 3/1983 | Izod et al. |
| 4,389,293 A | 6/1983 | Mani et al. |
| 4,686,198 A | 8/1987 | Bush et al. |
| 4,695,387 A | 9/1987 | Berry et al. |
| 4,765,779 A | 8/1988 | Organ |
| 4,800,024 A | 1/1989 | Elfline |
| 4,995,956 A | 2/1991 | Mani |
| 5,043,072 A | 8/1991 | Hitotsuyanagi et al. |
| 5,055,674 A | 10/1991 | Kotrappa |
| 5,084,184 A | 1/1992 | Burns |
| 5,200,046 A | 4/1993 | Chlanda et al. |
| 5,207,914 A | 5/1993 | Lin |
| 5,250,187 A | 10/1993 | Franks |
| 5,268,107 A | 12/1993 | Hutchings et al. |
| 5,512,178 A | 4/1996 | Dempo |
| 5,556,545 A | 9/1996 | Volchek et al. |
| 5,575,919 A | 11/1996 | Santina |
| 5,591,346 A | 1/1997 | Etzel et al. |
| 5,651,883 A | 7/1997 | Horwitz et al. |

(Continued)

OTHER PUBLICATIONS

Abdo et al., "A new technique for removing hexavalent chromium from waste water and energy generation via galvanic reduction with scrap iron", Energy Conservation and Management, vol. 39, No. 9, pp. 943-951, Jul. 1998. (Abstract).

(Continued)

*Primary Examiner*—Chester T Barry
(74) *Attorney, Agent, or Firm*—Dorsey & Whitney1 LLP

(57) ABSTRACT

Methods, systems and apparatus are provided for purging an adsorptive material of entrapped particulates. Methods, systems and apparatus rely upon a reverse loop for reversing the flow of medium within an adsorption material, allowing particulates caught within the adsorption material to be preferentially moved through and out of the adsorption material.

7 Claims, 14 Drawing Sheets

U.S. PATENT DOCUMENTS

| | | | |
|---|---|---|---|
| 5,679,256 | A | 10/1997 | Rose |
| 5,695,642 | A | 12/1997 | Greenleigh et al. |
| 5,707,514 | A | 1/1998 | Yamasaki et al. |
| 5,711,015 | A | 1/1998 | Tofe |
| 5,725,753 | A | 3/1998 | Harada et al. |
| 5,733,434 | A | 3/1998 | Harada et al. |
| 5,876,685 | A | 3/1999 | Krulik et al. |
| 5,951,874 | A | 9/1999 | Jangbarwala et al. |
| 6,042,731 | A | 3/2000 | Bonnin |
| 6,200,482 | B1 | 3/2001 | Winchester et al. |
| 6,471,861 | B1 * | 10/2002 | Burgard et al. .............. 210/232 |
| 6,531,063 | B1 | 3/2003 | Rose |
| 6,582,605 | B2 | 6/2003 | Krulik et al. |
| 6,583,081 | B2 | 6/2003 | Seff et al. |
| 6,613,230 | B2 | 9/2003 | Krulik et al. |
| 6,663,781 | B1 | 12/2003 | Huling et al. |
| 6,753,186 | B2 | 6/2004 | Moskoff |
| 6,849,187 | B2 | 2/2005 | Shaniuk |
| 7,105,087 | B2 | 9/2006 | Litz |
| 7,108,784 | B1 | 9/2006 | Williams et al. |
| 7,261,811 | B2 | 8/2007 | Nakhla et al. |
| 7,326,347 | B2 | 2/2008 | Williams et al. |
| 7,326,348 | B2 | 2/2008 | Williams et al. |
| 7,332,073 | B2 | 2/2008 | Johnson |
| 7,371,326 | B2 | 5/2008 | Dale |
| 7,390,414 | B2 | 6/2008 | Williams |
| 2003/0132155 | A1 | 7/2003 | Litz et al. |
| 2007/0215552 | A1 | 9/2007 | Williams et al. |
| 2008/0110832 | A1 | 5/2008 | Williams et al. |
| 2008/0128359 | A1 | 6/2008 | Litz et al. |

OTHER PUBLICATIONS

Ames, L. L., "Zeolitic Removal of Ammonium Ions from Agricultural and Other Wastewaters", 13th Pacific Northwest Industrial Waste Conference, Washington State University, pp. 135-152, 1967.

Barrado et al., "Characterisation of solid residues obtained on removal of Cr from waste water", Journal of Alloys and Compounds, vol. 335, pp. 203-209, Mar. 14, 2002. (Abstract).

Bishop, D. F. et al., "Physical-Chemical Treatment of Municipal Wastewater", Journal of Water Pollution Control Federation, vol. 44, No. 3, pp. 361-371, 1972.

çelik, M. S. et al., "Removal of Ammonia by Natural Clay Minerals Using Fixed and Fluidised Bed Column Reactors", Water Science and Technology: Water Supply, vol. 1, No. 1, pp. 81-88, 2001.

Chmielewska-Horváthová, E., "Use of Clinoptiloite in Ammonia Removal from Wastewater in and Outside Slovakia", Mineralia Slovavaca, vol. 27, No. 4, pp. 268-272, 1995.

Chmielewska-Horváthová, E., "Advanced Wastewater Treatment Using Clinoptiloite", Environment Protection Engineering, vol. 22, Issue 1-2, pp. 15-22, 1996.

Cooney, E. L. et al., "Ammonia Removal from Wastewaters Using Natural Australian Zeolite. II Pilot-Scale Study Using Continuous Packed Column Process", Separation Science and Technology, vol. 34, Issue 14, pp. 2741-2760, 1999.

DOWEX RSC, "Radium Removal from Groundwater with DOWEX RSX Radium Selective Computer Resin", DOWEX Ion Exchange Resins, http://www.dow.com/liquidseps, 2 pp., 2001.

Fazullina et al., "Removal of chromium compounds in the process of coagulation treatment of wool industry dyeing-finishing plant waste water", Soviet Journal of Water Chemistry and Technology, vol. 10, No. 5, pp. 85-88, 1988. (Abstract).

Hagiwara, Z. et al., "Ion-Exchange Reactions of Processed Zeolite and Its Application to the Removal of Ammonia-Nitrogen in Wastes", Natural Zeolites: Occurence, Properties, Use, International Conference on the Occurrence, Properties, and Utilization of Natural Zeolites, Tucson, Arizona, Pergamon Press, pp. 463-470, 1978.

Han, Ihn Sup, "Environmental engineering parameters affecting the removal of hexavalent chromium and nitroaromatic compounds from water by granular activated carbon", Thesis, 178 pages, 1999. (Abstact).

Haralambous, A. et al., "The Use of Zeolite for Ammonium Uptake", Water Science and Technology Journal, vol. 25, No. 1, (1992), pp. 139-145.

Hayhurst, D. T., "The Potential Use of Natural Zeolites for Ammonia Removal During Coal-Gasification", Natural Zeolites: Occurrence, Properties, Use, International Conference on the Occurrence, Properties, and Utilization of Natural Zeolites, Tucson, Arizona, Pergamon Press, pp. 503-507, 1978.

Jørgensen, S.E., "Ammonia Removal by Use of Clinoptilolite", Water Research, vol. 10, pp. 213-224, 1976.

Kalló, D., "Wastewater Purification in Hungary Using Natural Zeolites", Natural Zeolites '93, International Committee Natural Zeolites, Brockport, New York, pp. 341-350, 1993.

Klieve, J. H. et al., "An Evaluation of Pretreated Natural Zeolites for Ammonium Removal", Water Research - The Journal of the International Association on Water Pollution Research, vol. 14, No. 2, Pergamon Press, pp. 161-168, 1980.

Koon, J. H. et al., "Optimization of Ammonia Removal by Ion Exchange Using Clinoptilolite", SERL, Report No. 71-5, University of California, Berkeley, California, pp. 1-189, 1971.

Koon, J. H. et al., "Ammonia Removal from Municipal Wastewaters by Ion Exchange", Journal Water Pollution Control Federation, vol. 47, No. 3, pp. 448-465, 1975.

Kosarek, Louis J., "Radionuclide removal water," Environmental Science & Technology, vol. 13, No. 5, pp. 522-525 (1979).

Kutsy, V. G., "The Removal of Co; 2; +, Ni; 2; +, Cu; 2; +, Zn; 2; +, Mn; 2; +, Fe; 3; + and Cr; 6; + out of Water Solutions by Phosphates of Metals", EKOTEKHNOLOGII I RESURSOSBEREZHENIE, Part 1, pp. 42-45, 2002. (Abstract).

Lin, et al., "The removal of hexavalent chromium from water by ferrous sulfate", Hazardous and industrial wastes: Proceedings of the twenty-seventh Mid-Atlantic industrial waste conference, Technomic Publishing Co., Inc., Lancaster, PA, 1995. (Abstract).

McLaren, J. R. et al., "Factors Affecting Ammonia Removal by Clinoptilolite", Journal of the Environmental Engineering Division, ASCE, vol. 1973, pp. 429-444, 1973.

Melitas et al., "Kinetics of soluble chromium removal from contaminated water by zero valent iron media: corrision inhibition and passive oxide effects", Environmental Science Technology, vol. 35, No. 19, pp. 3948-3953, 2001. (Abstract).

Mercer, B. W., "Clinoptilolite in Water-Pollution Control", The Ore Bin, vol. 31 No. 11, pp. 209-213, 1969.

Mercer, B. W., "Ammonia Removal from Secondary Effluents by Selective Ion Exchange", Journal Water Pollution Control Federation, vol. 42, No. 2, pp. R95-R107, 1970.

Philipot et al., "Hexavalent Chromium Removal from Drinking Water", Water Science and Technology, vol. 17, No. 6/7, pp. 1121-1132, 1985. (Abstract).

Sarre et al., "Chromium removal in water by modified cellulose", Journal of Water Science, vol. 1, No. 1-2, pp. 55-71, 1988. (Abstract).

Semmens, M. J. et al., "Biological Regeneration of Ammunium-Saturated Clinoptilolite. II The Mechanism of Regeneration and Influence of Salt Concentration", Environmental Science & Technology, vol. 11, pp. 260-265, 1977.

Semmens, M. J. et al. "Nitrogen Removal by Ion Exchange: Biological Regeneration of Clinoptilolite", Journal of the Water Pollution Control Federation, vol. 49, No. 12, pp. 2431-2444, 1977.

Semmens, M. J. et al., "Clinoptilolite Column Ammonia Removal Model", Journal of the Environmental Engineering Division, Proceedings of the American Society of Civil Engineers, vol. 104, No. EE2, pp. 231-244, 1978.

Semmens, M. J. et al., "The Regeneration of Clinoptilolite by Biologically Restored Brine", University of Illinois, Water Resources Center, Research Report No. 139, pp. 1-1 through C-10, 1979.

Semmens, M. J. et al., "Ammonium Removal by Ion Exchange: Using Biologically Restored Regenerant", Journal of Water Pollution Control Federation, vol. 51, Issue 12, (Dec. 1979), pp. 2928-2940.

Semmens, M. J., "Ammonium Removal by Clinoptilolite Using Biologically Assisted Regeneration", 5th International Conference on Zeoliltes, Naples, Florida, pp. 795-804, 1980.

Slechta, A. F. et al., "Water Reclamation Studies at th South Lake Tahoe Public Utility District", Journal of the Water Pollution Control Federation, vol. 39, pp. 787-814, 1967.

Smith, S. A. et al., "Tahoe-Truckee Water Reclamation Plant. First Year Review", Water Reuse Symposium, vol. 2, pp. 1435-1445, 1979.

Svetich, Richard, "Long-Term Use of Clinoptilolite in the Treatment of Sewage at Tahoe-Truckee Sanitation Agency, Truckee, California", Natural Zeolites: Occurrence, Properties, Use, International Conference on the Conference, Properties, and Utilization of Natural Zeolites, Red Lion Hotel-Riverside, Boise, Idaho pp. 197-201, 1993.

Townsend, R. P. et al., "Ion Exchange Properties of Natural Clinoptilolite, Ferrierite and Mordenite: 1. Sodium-Ammonium Equilibria", Zeolites, vol. 4, No. 2, pp. 191-195, 1984.

* cited by examiner

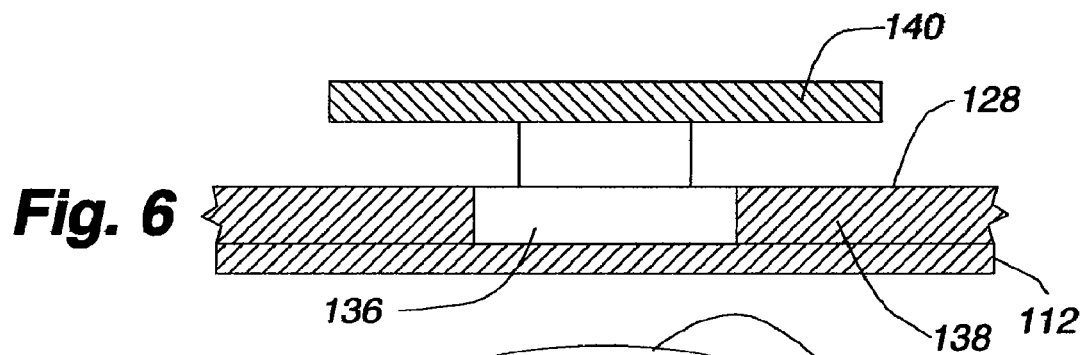
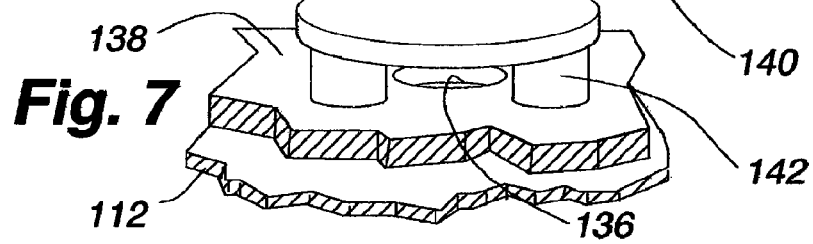
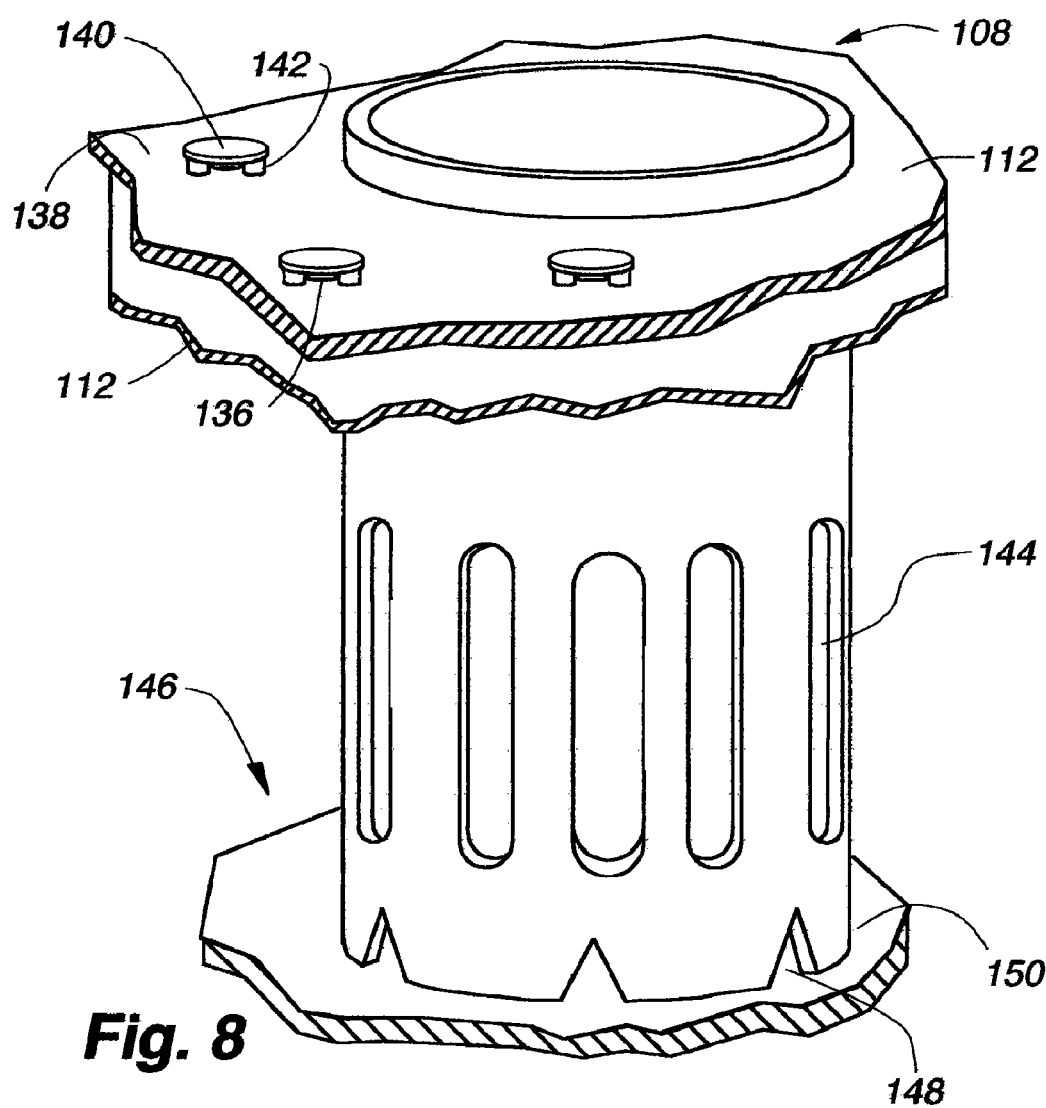

SYSTEM AND APPARATUS FOR PURGING ABSORPTIVE MATERIALS USED IN THE REMOVAL OF CONTAMINATES FROM AN AQUEOUS MEDIUM

CROSS-REFERENCE TO RELATED APPLICATIONS

The present application claims benefit under 35 U.S.C. §119(e) to U.S. Patent Application No. 60/737,159, filed Nov. 15, 2005 and incorporated herein by reference in its entirety. The present disclosure is related to U.S. Patent Application No. 60/515,921 filed Oct. 29, 2003 and entitled DYNAMIC UP-FLOW ZEOLITE SYSTEM, which is herein incorporated by reference in its entirety.

BACKGROUND OF THE INVENTION a. Field of the Invention

The invention generally relates to methods, systems and apparatus for removal of a contaminate from an aqueous medium. More specifically, the invention provides methods, systems and apparatus for minimizing back-pressure in an adsorption material constrained within a housing, the adsorption material used to remove contaminates from a flowing aqueous medium.

b. Background Art

Cities and towns throughout the world depend on having clean potable water. The dependence on clean potable water has increased as the population of the world has increased, especially as industrial use of fresh water resources have become commonplace. Increased industrial use of fresh water resources has resulted in a corresponding deterioration of water quality throughout the world, due partly to industrial related release of contaminates into the water. In addition, contaminates are also naturally present in various fresh water resources, for example, high uranium content in fresh water resources throughout areas of Colorado, New Mexico and Texas.

The decrease in water quality is contravening to the world's increased dependence on clean potable water supplies, requiring a concerted effort toward both minimizing the release, and removing existing contaminates, from water supplies throughout the world (whether the contaminates are natural or released as industrial pollution).

Conventional water treatment facilities are often equipped with specialized systems for removal of specific contaminates from a water supply. For example, water treatment facilities can be equipped to contact the water supply with an affinity material having sorptive qualities toward a specific contaminate. Typically, these sorptive materials are constrained in a column, or other like housing, that receives the water source, treats the water source, and passes the water source back to a traditional water treatment facility.

A number of target contaminates can be removed from a water source when contacted to a sorptive material. For example, removal of uranium from an aqueous medium has previously been described in U.S. Provisional Patent Application No. 60/619,369, filed Oct. 15, 2004.

Conventionally, removal of contaminates using sorptive materials is often accomplished through the use of down- or up-flow media adsorption. Aqueous medium is released onto the adsorptive material and flows through the material in a given direction. One problem facing the water treatment industry is the clogging of these large volume housing units with suspended particulates in the aqueous medium. Clogged adsorption material leads to increased pressures required to "force" the water through the adsorption and particulate material. The clogging ultimately results in more costly water treatment and shut down to either replace the adsorption material or to perform costly backwash, where the aqueous medium and clogging particles are forced through and out of the column in the opposite direction of normal flow, carrying the particulates out of the column for disposal.

In particularly problematic cases, the particulates have a low level of radioactivity, for example, the particulates may have a low amount of uranium. When radioactive particulates are concentrated within an adsorption material they often must be disposed of at a low level radioactive repository. In contrast, under normal flow through conditions, the radioactive material in the particulates is often at such low concentrations, that it is allowed to pass onto the end user of the water, to a sewer system, or to a water treatment facility.

Against this backdrop the present invention was developed.

BRIEF SUMMARY OF THE INVENTION

The present invention provides methods, systems and apparatus for contacting an adsorption material with a continuous flow of aqueous medium for the removal of target contaminates from the aqueous medium. Adsorption material is constrained within a housing, typically a compartmentalized column, and aqueous medium is passed through the housing in an up-flow direction. Aspects of the invention limit back-pressure build-up from within the housing by preferentially eliminating particulates and other clogging materials from the adsorption material. Aspects of the invention provide a significant cost and time benefit over standard backwash procedures used to dislodge particulates from within an adsorption material.

In one aspect of the invention, methods are provided for limiting back-pressure within a column by providing an environment within the column that preferentially causes particulates, located in most aqueous medium sources, trapped within the adsorption material to be moved toward, and ultimately out, of the column. The methods include stopping the normal up-flow direction of the aqueous medium through the column when a pre-determined level of back-pressure has built up within the column, thereby allowing the adsorption material and particulates to settle in the column. Stopping the up-flow of the aqueous medium within the column allows the adsorption material to settle within the column, where particulates are typically of a lesser density than the adsorption material, thereby settling slower and preferentially moving toward the outlet end of the adsorption material. The flow of the aqueous medium is then reversed and circulated within the compartments of the column to agitate and preferentially further move particulates to the top side of the adsorption material. The reversal of the aqueous medium provides a loop of flow from the middle inside compartment of the column, to the outside of the column, to the top inside of the column and then back down to the middle inside of the column. This loop of flow causing the particulates to preferentially settle and concentrate on the outlet side of the adsorption material. An alternative slow start can also be used to expand the adsorption material in the up-flow direction, removing particulates and allowing particulates within the top region of the adsorption material to also be removed from the column. Note that aspects of the present invention provide a method that preferentially moves particulates from the inlet of the column to the outlet of the column without major concentrations of particulates being trapped in the adsorption material.

In another aspect of the invention, a column is provided having an integrated reversal loop built into the column. The reverse loop includes a pump or other like device for reversing the flow of the fluid within the column, a series of piping on the outside of the column for moving aqueous medium from the middle of the column to the top of the column and a shut off valve for stopping the back-wash of the aqueous medium out the inlet of the column (especially when the fluid is reversed toward the inlet). Other aspects of the invention provide systems having integrated purging columns and filters for passing particulates found in an aqueous medium from the feed to the discharge to a sewer or other like discharge spot.

These and various other features and advantages of the invention will be apparent from a reading of the following detailed description and a review of the appended claims.

BRIEF DESCRIPTION OF THE DRAWINGS

FIG. 6 is an illustrative cross sectional view along line 6-6 of FIG. 5B.

FIG. 7 is an illustrative perspective view of one opening in the divider shown in FIG. 5A in accordance with one embodiment of the present invention.

FIG. 8 is an illustrative perspective view of a purging column distribution pipe in accordance with one embodiment of the present invention.

DETAILED DESCRIPTION OF THE INVENTION

Figure 1:
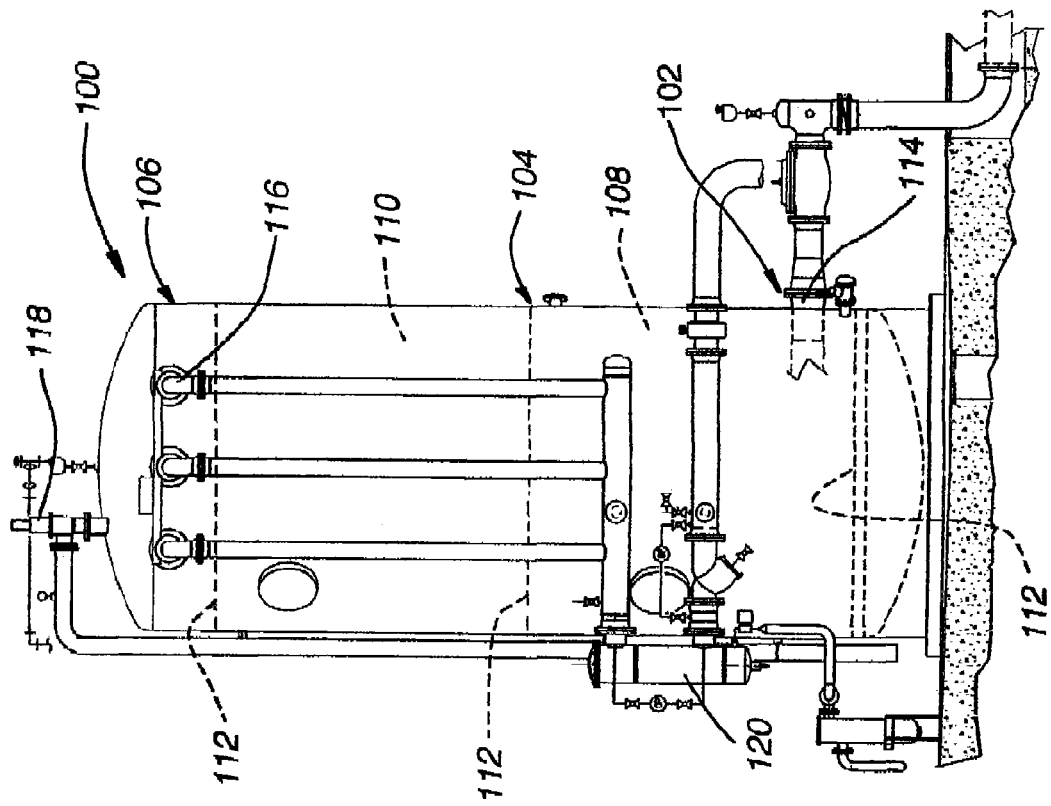
FIG. 1 is an illustrative side view of a purging column showing an inlet and an outlet of the column in accordance with one embodiment of the present invention.

The following definitions are provided to facilitate understanding of certain terms used frequently herein and not meant to limit the scope of the present disclosure:

"Aqueous medium" or "aqueous media" refers to water, e.g., drinking water, or any liquid having water as a constituent. In some cases, aqueous medium can comprise a contaminate in need of removal, e.g., an aqueous medium can be ground water contaminated with $U^{238}$ or radium. In addition, aqueous medium typically contains some level of suspended particulates or solids.

"Back-pressure" refers to pressure that exists within the housing or column used to constrain the adsorptive material of the present invention. The pressure within the column is a reflection of how much force is required to move the aqueous medium through the adsorptive material of the column. For purposes of the present invention, an increase in back-pressure refers to any increase of pressure within the column that occurs once a column has been packed with an adsorptive material and aqueous medium run through the column for some length of time, e.g., if a column has an initial pressure of 2-3 pounds/in$^2$, an increase in back-pressure is when the pressure required to move the aqueous medium through the adsorptive material is above 3 pounds/in$^2$, for example 5 pounds/in$^2$. For purposes of the present invention, increased back-pressure within a column is generally caused by clogging of the adsorptive material with particulates from within aqueous medium.

"Feed" refers to an aqueous medium before entering a column or system of the present invention. For example, a feed may be a ground water supply just prior to entering a column designed in accordance with the present invention.

"Particulate" refers to materials suspended in aqueous medium being treated by the methods and systems of the present invention. Particulates typically clog filters or adsorption-based materials, e.g., resins, during flow of the aqueous medium through the adsorption material of the present invention. Particulates can also be radioactive, for example, suspended particulates having a low level of radionucleotides incorporated therein.

"Adsorb" and "absorb" refer to the same basic principle of one substance being restrained by another substance. The process can include attraction of one substance to the surface of another substance or the penetration of one substance into the inner structure of another substance. For example, the present invention contemplates that resins can either adsorb or absorb uranium from an aqueous medium, i.e., for purposes of the present invention the two terms are interchangeable. Other terms may also be used to describe this interaction and are also within the scope of the present invention, these terms include: sorption, binding, trapping, etc, all of which for purposes of the present invention are interchangeable with adsorption.

"Adsorption material" or "adsorptive material" refers to ion exchange resins, zeolites (natural and synthetic), activated media (granular activated carbon and activated alumina) and other like materials that have adsorptive characteristics for contaminates within an aqueous medium. Different types of adsorptive materials are used for the removal of different contaminates, i.e., have different adsorptive characteristics for different contaminates. In addition, different adsorptive materials have different density and shape i.e., sedimentation/settling parameters, within a given aqueous medium, thereby different adsorption materials have different characteristics within the context of the present invention. Adsorptive materials of the present invention, as used in the context of the present invention, have a higher settling rate than the majority of particulates in an aqueous medium treated by that adsorptive material, but are also dispersed against gravity in the direction of the up-flow during normal operations of apparatus of the invention. Exemplary adsorption materials include synthetic anion and cation exchange resins and zeolites.

"Up-flow" refers to the direction that aqueous medium flows through an adsorptive material constrained in a housing of the present invention. Up-flow is generally in a direction that contravenes gravity, as compared to down-flow, which at least partially relies on gravity to pass the aqueous medium over the adsorption material constrained within a housing. Up-flow of aqueous medium generally requires a certain amount of pressure to move the medium through the adsorption material against gravity. Dependent on the density of the adsorption material and the flow rate of the aqueous medium, up-flow aqueous medium can suspend the adsorption material toward the outlet end of the housing. In preferred embodiments of the present invention, up-flow refers to a sufficient flow of aqueous medium to force an adsorption material to the outlet end of the housing.

Embodiments of the present invention provide methods, systems and apparatus for limiting back-pressure within an adsorption material containing housing, where the adsorption material containing housing is used for removal of contaminates from an aqueous medium in a timely and effective manner. Embodiments of the present invention are useful in the context of continuous flow of an aqueous medium through a housing that constrains a useful amount of adsorption material. The adsorption material has an affinity for certain target contaminates found within the aqueous medium, for example, an strong base anion exchange resin for uranium. Aqueous medium flows through the housing in generally an up-flow direction, i.e., contravening, or flowing against, some or all of the effects of the downward force of gravity. The methods, systems and apparatus are generally useful in numerous different housing shapes or sizes, numbers of connected housing units, i.e., one, two, three, etc, and types of adsorption materials constrained within the housing units (see below). Note that for purposes of the present invention, the following embodiments will be described with regard to a column, although other housing units can be also be used. Description of a column unit is not meant to limit the present invention to columns, but simply as an illustrative unit that can be used to constrain adsorption material in the context of the present invention.

Embodiments of the present invention provide for the reduction of back pressure within an adsorption material containing column through reduction of particulates trapped within the adsorption material. In most embodiments, methods, systems and apparatus are provided to preferentially release particulates from the adsorption material for the discharge of the aqueous medium with an amount of particulates previously trapped in the adsorption material, thereby avoiding a timely and expensive back-wash and potential manual disposal of built-up particulates at a disposal site from the adsorption material.

Purging Column

The present invention provides a column for the contact between an adsorption material and a continuous or discontinuous flow of aqueous medium, the column adapted for fast and efficient particulate purging and ensuing reduction in the back-pressure within the column. In addition, the invention provides efficient methods, systems and apparatus for avoiding the time and cost of disposing concentrated amounts of particulates that have been trapped within an adsorption material.

Referring to FIGS. 1-8, column embodiments of the present invention are shown, each column 100 generally having an input end 102, a middle portion 104, and an output end 106. Columns 100 can be singular and constrain one set amount of adsorption material (see FIGS. 14B, 15 and 16) or define two or more compartments 108, 110 within, each compartment having a set amount of adsorption material (for example, FIGS. 1-8). Compartments within one column are generally stacked on top of each other due to the up-flow direction of the aqueous medium, each compartment separated by a screen and optionally a (see below and FIG. 5A). Note that additional compartments can be included within a column, dependent on the capacity, aqueous medium flow rate, size of the compartment, etc.

Referring to FIG. 1, a side view of a purging column 100 in accordance with the present invention is shown. The column generally has an inlet 114, a pair of stacked compartments 108, 110 separated by a divider 128 and screen 112, an outlet 116, and a pressure release valve 118. Aqueous medium, or the feed, enters the column at the inlet 114 located at the input end 102 of the column 100. The aqueous medium moves through the first 108 and then second 110 compartments and is discharged out of a series of one or more outlet pipes 116. In the process of moving through the two compartments, contaminates within the aqueous medium are removed via constrained adsorption material within each of the two compartments (see below and not shown in FIG. 1). A pressure valve 118 acts as a pressure release when the pressure within the column reaches unacceptable levels. In an optional embodiment, a filter unit 120 is shown receiving the discharged aqueous medium for filtration of discharged particulates and/or adsorption materials from the column during operation.

Figure 2:
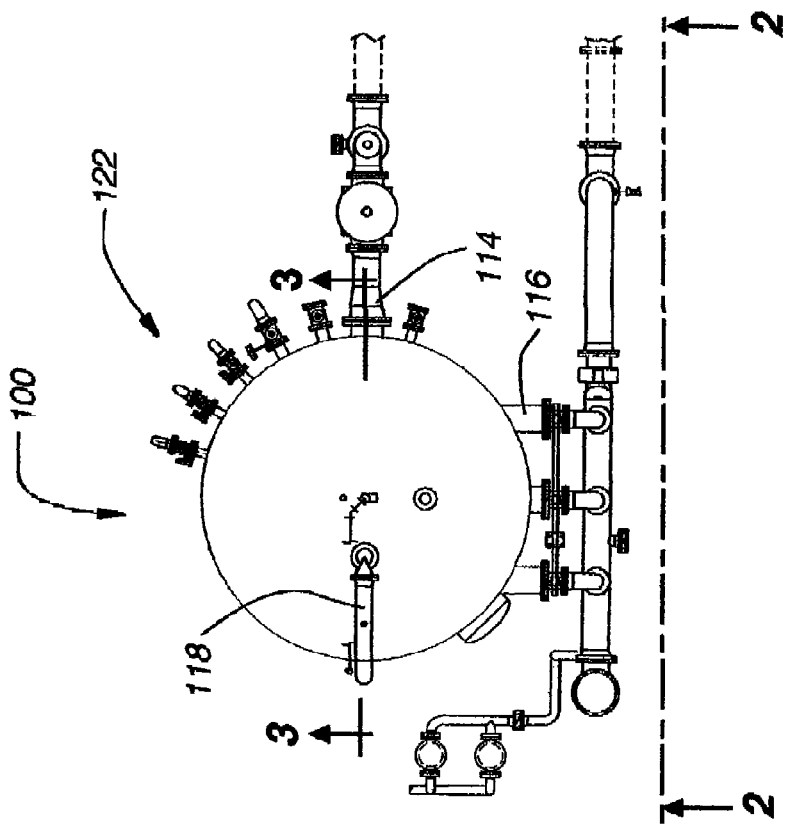
FIG. 2 is an illustrative top view of a purging column showing an inlet, an outlet and a reverse loop in accordance with one embodiment of the present invention.

FIG. 2 depicts a top view of a column 100 (for example as shown in FIG. 1) in accordance with the present invention, providing a view of a reverse loop 122 for reversing or purging the adsorption material in the two compartments 108, 110 when the normal up-flow direction of the column is interrupted. The reverse loop 122 has vertical piping for circulating aqueous medium and particulates from the lower or first compartment of the column to the upper or second compartment of the column. The reverse loop will be described in greater detail below and especially in FIGS. 10-13. Typically a pump or other like device is used for establishing this reverse circulation (see FIGS. 3A and 10-13). As is discussed in greater detail below, the reverse circulation of aqueous medium results in the removal of particulates from the column, the cleaning of debris caught within the divider/screen 128/112 and 123/111 of the column 100 and the capacity to allow particulates through the column in a non-concentrated, dilute manner, thereby eliminating the need for disposal of concentrated particulates.

Figure 3A:
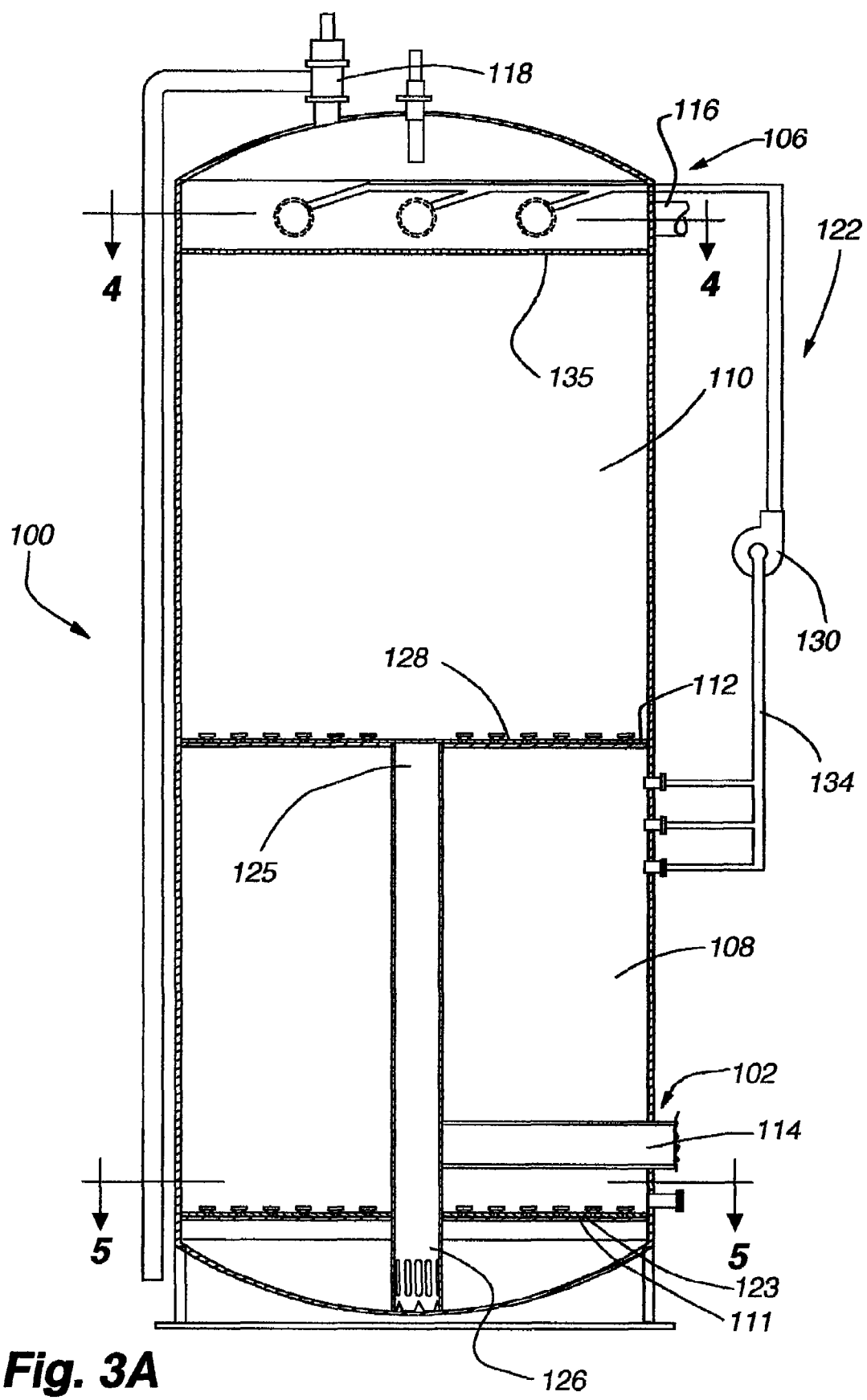
FIG. 3A shows a cross sectional view along line 3-3 of FIG. 2.
Figure 3B:
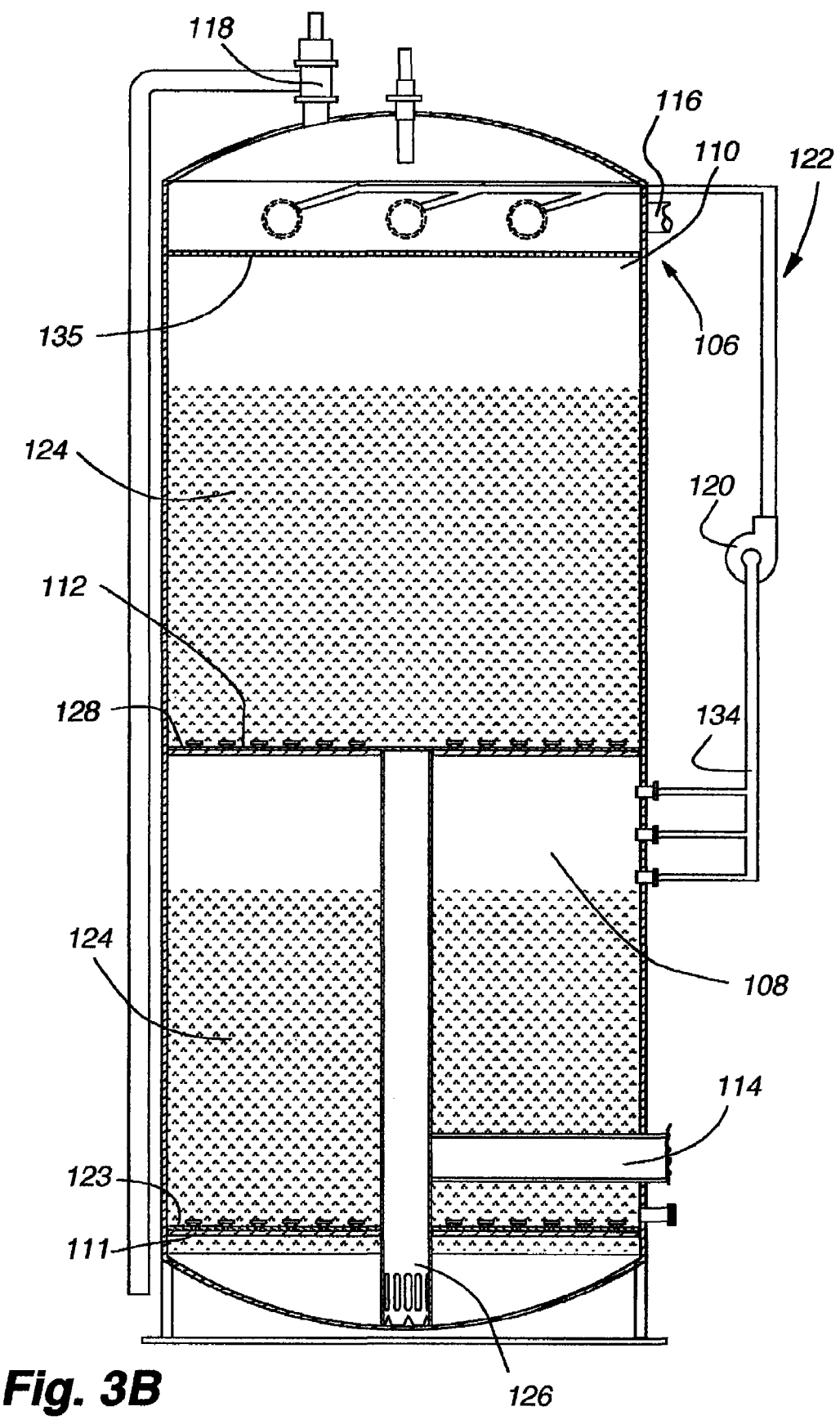
FIG. 3B is an illustrative cross sectional view of a purging column having two compartments, each compartment constraining a portion of adsorption material and showing a reverse loop, the purging column in accordance with one embodiment of the present invention.

FIGS. 3A and 3B show cross sectional views of a purging column 100 in accordance with embodiments of the present invention. FIG. 3A provides a column in absence of adsorption material, and FIG. 3B provides the same view but with each compartment 108, 110 within the column 100 packed with an appropriate amount of adsorption material 124. Each column shows a reverse loop 122 for reversing the circulation of aqueous medium within the column. Under normal operating conditions, aqueous medium enters the column 100 via an inlet 114 on an input end 102 of the column. A distribution pipe 126 delivers the aqueous medium to a point below a screen 111 and divider 123. A second screen 112 and divider 128 separates the column into two compartments 108, 110. One end 125 of the distribution pipe 126 is also adapted to support the second divider 128 within the column. Column outlets 116 are shown from the second compartment 110 of the column. A pressure release provides release of unacceptably high levels of pressure from the column.

A reverse loop 122 having a pump 130 for circulating aqueous medium from the first compartment 108 to the second compartment and back to the first compartment 108. As will be discussed in greater detail below, the reverse loop 122 provides an integrated loop for unclogging/purging clogged adsorption material and screen/divider 112/128 and 111/123 within the column 100 and release particulates with the discharge of the treated aqueous medium through the outlet 116. The pump circulates the aqueous medium from the first compartment 108 to one or more exterior reverse loop pipes 134 to the distribution pipes located above the divider at the output end of the column. The aqueous medium is then pushed via the pump and gravity back through the second compartment 110 and to the first compartment 108. Note that the column is closed off by a shut off valve (not shown), so that the aqueous medium does not back-wash out of the column through the inlet 114.

Figure 4:
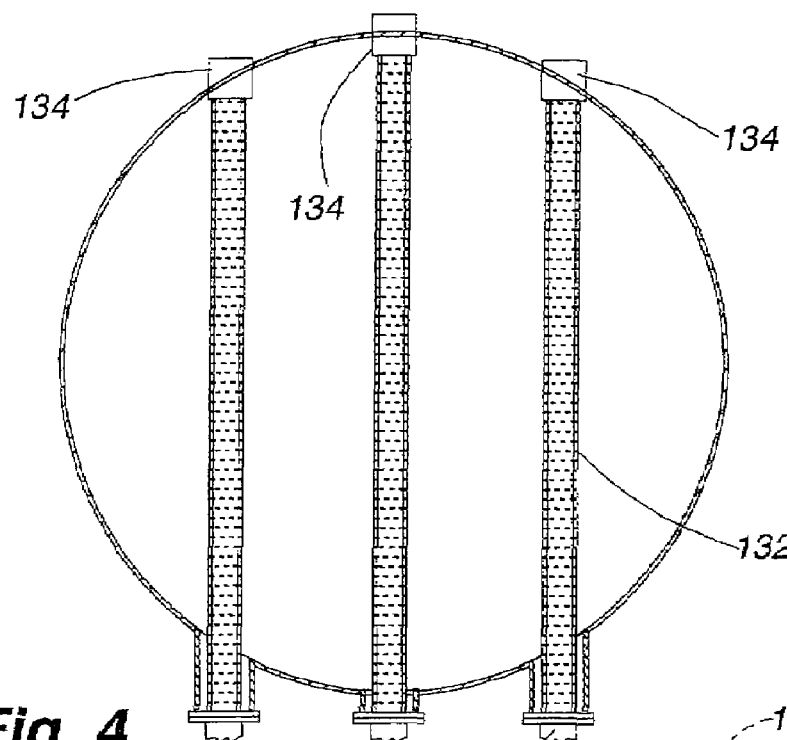
FIG. 4 is a cross sectional view along line 4-4 of FIG. 3A.

FIG. 4 illustrates a view along line 4-4 of FIG. 3A. The reverse loop 122 in the purging column 100 is connected to a series of pipes 132 (for example 3 pipes) that extend across the diameter of the column at the output end 104 of the column. At the opposite side from the outlet, the reverse loop pipes 134 can connect to the series of pipes 132 or be capped off. As such, the pipes 132 act to receive aqueous medium being reversed in direction and used in the reverse loop 122 to remove particulates from the adsorption material and clean the divider 128 and 123 and screens 112 and 111 (discussed in more detail below). The pipes 132 can define openings 134 throughout for discharging medium back into the second compartment 110 via the screen 135. Note that other configurations for an outlet are considered within the scope of the present invention, including one or more outlet pipes, a flat divider and an outlet, etc.

In general, a screen 135 is positioned across the top portion of the second compartment 110 but at or below the location of the outlet 116. Screen 135 may optionally be coupled to a divider. Adsorption material 124 is typically limited from passing through the screen 135, thereby eliminating the need for a screen on the outlet pipes. At the same time, aqueous medium and particulates are able to freely pass through the screen 135 and are thereby discharged out the outlet pipes with a limited amount of adsorption material.

Figure 5B:
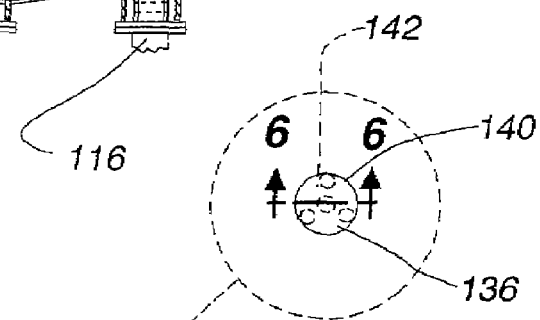
FIG. 5B is an exploded view of one opening in the divider shown in FIG. 5A.
Figure 5A:
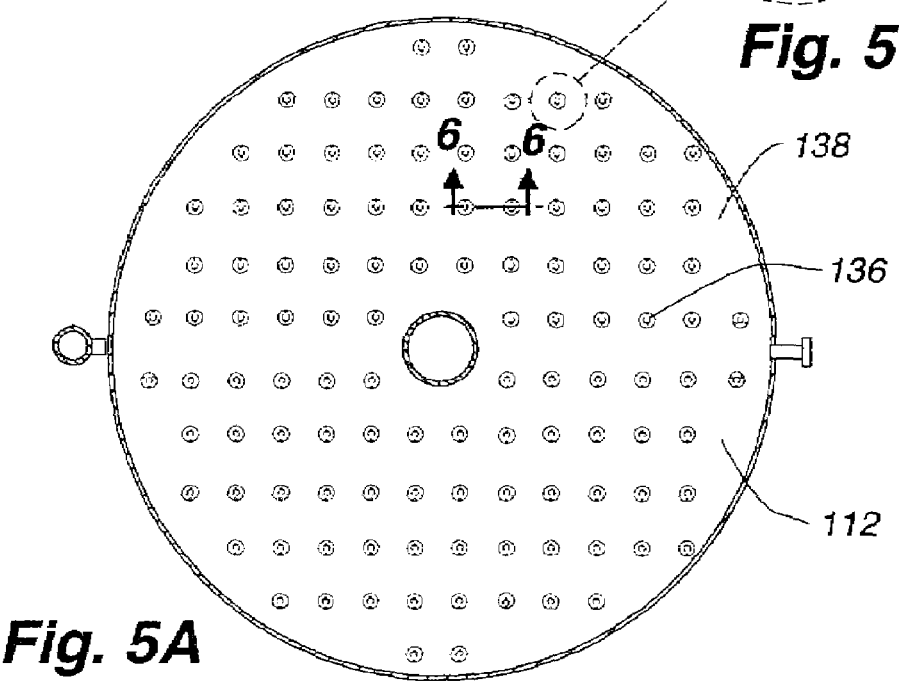
FIG. 5A is a cross sectional view along line 5-5 of FIG. 3A.

FIG. 5A is a top view of a divider 128 and screen 112 for support of adsorption material 124 within a purging column 100. The divider 128 provides a series of protected openings 136 (see FIGS. 5B, 6 and 7) for passage of aqueous medium through the divider 128, while acting as a platform or support to carry the weight of any settled adsorption material 124. Divider 123 and screen 111 have the same properties as divider 128 and screen 112. In various embodiments, screens 111 and 112 are provided without one or both of the dividers 123 and 128.

Orientation of the protected openings 136 through the divider 128 is shown especially well in FIGS. 6 and 7. The screen 112 limits the back movement of the adsorption material 124 with gravity back through the opening 136. A raised deck 140 overlaps each opening 136, providing a space between the raised deck and platform. The deck provides protection from the bulk of the adsorption material moving through the opening, especially when the purging column is not operating in the normal or up-flow direction, where aqueous medium moving through the divider openings generally moves the adsorption material away from the top side of each divider. The raised deck can be supported by a series of columns 142 or by a cylindrical screen or mesh (not shown).

Note that the specific gravity of the adsorption material is considered when designing a purging column of the present invention. As can be seen from FIGS. 5B, 6 and 7, the divider of the present invention limit but do not prevent the passage of adsorption material that is pressed against the bottom side of the divider during normal operating conditions. In typical embodiments, the adsorption material has a specific gravity that causes the adsorption material to suspend in the aqueous medium during normal up-flow conditions, but settle faster than particulates when the up-flow is shut down. Preferably, the adsorption material is substantially packed against a divider at the output end of each compartment 108, 110 within the column during normal up-flow conditions.

FIG. 8 provides an illustrative view of a distribution pipe 126 for input of the aqueous medium below a divider 128 and screen 112 and into a first compartment 108 of the purging column 100. The distribution pipe 126 has a generally cylindrical shape and a series of longitudinal slots 144 formed therethrough for release of the aqueous medium into a third compartment 146 formed between the divider and compartment wall. In addition, the pipe 126 defines a series of notches 148 at the point where the distribution pipe 126 meets the bottom plate 150 of the column 100 to provide further ingress points of aqueous medium into the compartment 146 below the divider. The aqueous medium moves uniformly from this pre-adsorption material compartment 146 through the divider openings 136 and into the first compartment 108, the first compartment having an appropriate amount of adsorption material for removal of a target contaminate.

Method for Purging Particulates from an Absorption Material Constrained in a Column The present invention provides methods for purging particulates from an adsorption material that are contained within a column. Purging of the adsorption material facilitates the removal of particulates from within the adsorption material and thereby reduces or eliminates back-pressure from within the column. The column purge results in the absorption material being cleared of some or all of the particulates, thereby unclogging the adsorption material and returning the column to normal up-flow pressures and conditions, i.e., reduces built-up back pressure that results from particulates within the aqueous medium clogging the adsorption medium. In addition, release of clogging particulates can be accomplished in small enough intervals to allow for direct release with the discharge of the treated aqueous medium and typically eliminates the need for separately disposing of the concentrated particulates.

As such, methods of the invention provide a time and cost effective solution to limiting or eliminating back-pressure that builds up in a column used to remove contaminates from an aqueous medium. In addition, methods of the present invention allow for the removal of particulates into a treated aqueous medium discharge stream and avoids manually collecting and disposing of the same particulates that have concentrated within the adsorption material of the present invention. Finally, the methods of the invention provide a cleaning process for clearing the openings within the dividers of built-up materials.

Figure 9:
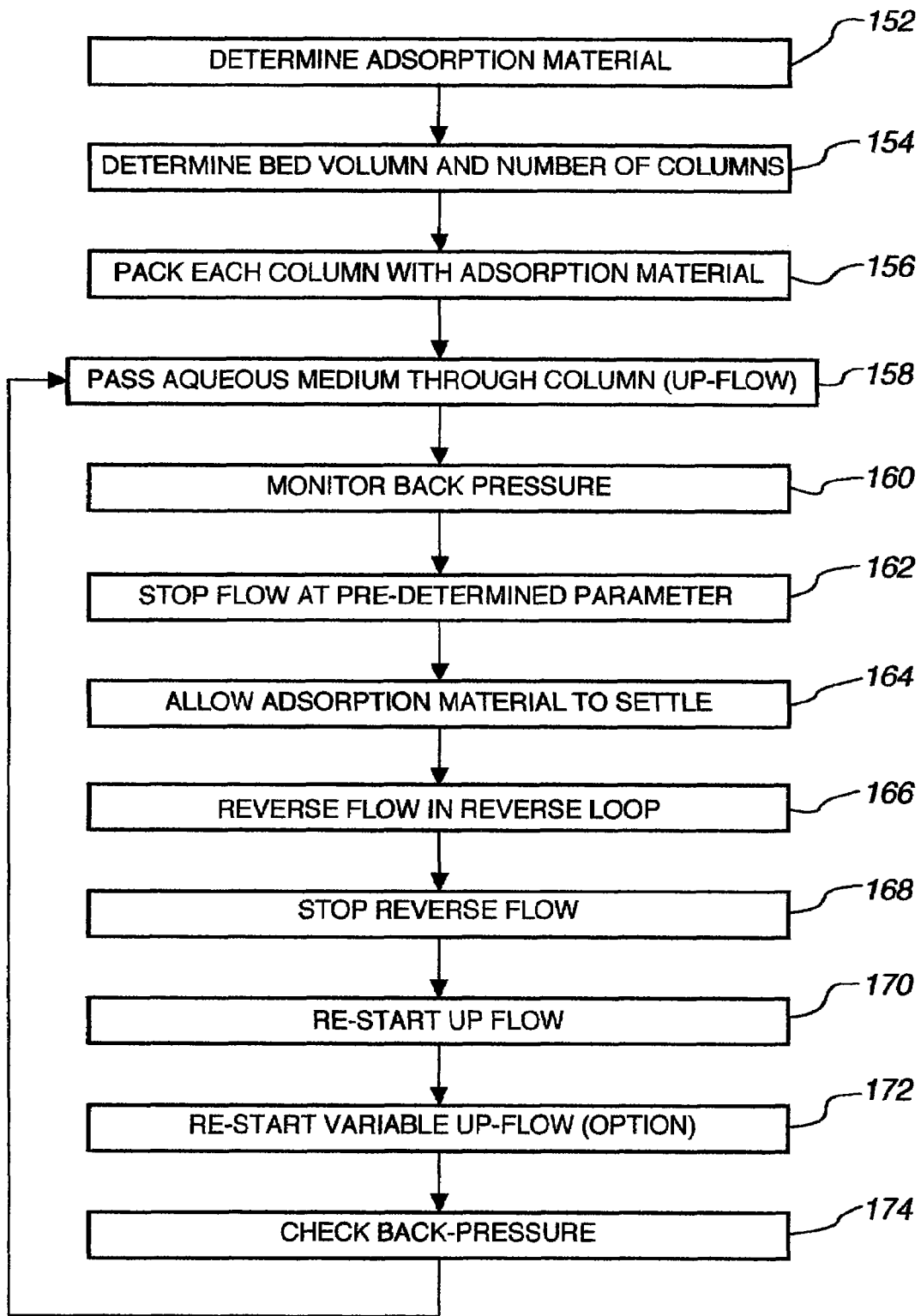
FIG. 9 shows a flow diagram for purging a column operating in an up-flow direction in accordance with one embodiment of the present invention.

FIG. 9 provides an illustrative flow chart of one embodiment for purging a column in accordance with the present invention. A column is provided having a reverse loop as described above (see FIGS. 1-8). As an initial determination, a user determines the type of adsorptive material that best suits the removal of a target contaminate from an aqueous medium of interest 152. For example, where removal or uranium from a ground water source is a concern, a user may determine to use a specific strong base anion exchange resin known to be useful for removing uranium under the ground water pH, salinity and the like conditions. Once an adsorption material has been identified, the user determines what amount of adsorption material, column diameter and number of columns should be used for treatment of the particular aqueous medium of interest 154. Columns are packed with the appropriate amount of adsorption material of interest 156. Preferably, columns are packed with an amount of adsorption material required for treatment of the levels/flow rate of aqueous medium and contaminate at the treatment site.

Once the column(s) of the present invention are ready for use, aqueous medium is passed through the columns at a starting flow rate 158. The aqueous medium is typically passed through the column in an up-flow direction. Typical flow rates for a drinking water source at start up is from about 3 to 15 gpm/ft². The back-pressure of the start-up flow is monitored 160. Given the column diameter and length, flow rate, adsorption material and bed size, an upper amount of back-pressure is determined. Note that the up-flow rate and adsorption material density and sedimentation parameters cause the adsorption material to form a packed bed at the output end of each compartment within the column, i.e., at the end of the compartment where the adsorption material is most influenced by gravity.

The column is monitored and back-pressure considered until the back-pressure in the column is unacceptably close to the determined threshold value 162. Once a determination has been made, either manually or automatically, the up-flow of aqueous medium is stopped for a period of at least 30 seconds. During the shut-down time, the adsorption medium is allowed to settle through the aqueous medium in each compartment of the column 164. The settling of particulates and adsorption material within the aqueous medium is determined by the settling velocity or fall velocity of the sediment. In typical embodiments of the present invention, the particulates have a slower settling velocity and migrate toward the upper end of the settled adsorption material. A reverse flow pulse is then applied to the aqueous medium zone directly above the top of the settled adsorption material and particulate bed 166. The aqueous medium and the top portion of the bed is pulled through the reverse loop and distributed back to the output end of the column. Typical reverse pulses last from about 5 to about 15 seconds and continue to facilitate the settling out of adsorption material and particulates into the adsorption material bed.

After from one to about five pulses, the reverse loop is stopped and the adsorption material allowed to settle 168. Note that a portion of the particulates interspersed throughout the adsorption material have now been re-distributed onto the top end (output end) of the adsorption material bed. In this manner, particulates that are generally located at the input end of the adsorption material, and thereby clogging the adsorption material, have been re-distributed toward the output end of the same adsorption material bed.

The column is now re-started in the up-flow direction 170. Particulates that have settled out onto the top layers of the adsorption material are now able to exit through the output end of the column (note that a screen prevents the escape of adsorption material through the same egress point) with the aqueous medium discharge. A filter or filters or other device may be used outside the housing to capture the particulates (see below), while the treated aqueous medium is discharged into a discharge site, e.g., into a water treatment facility.

In an alternative embodiment, the column is re-started in a variable up-flow manner 172. The variable or "slow" start is devised to gradually expand the adsorption material bed (input end) to the output end of the column (within each compartment), where the adsorption material ultimately packs. This gradual expansion provides a period where some trapped particulates are able to move through the adsorption material and out of the column. Typical slow starts are performed over a period of 0.5 to about 10 minutes and are from about 5% to about 100% the normal flow rate of the column. A check of back pressure may then be performed to determine the effectiveness of the adsorption material purging procedure 174. Assuming back-pressure has been reduced to below the threshold value, the column is resumed to normal up-flow operating conditions, see arrow 176.

Figure 10:
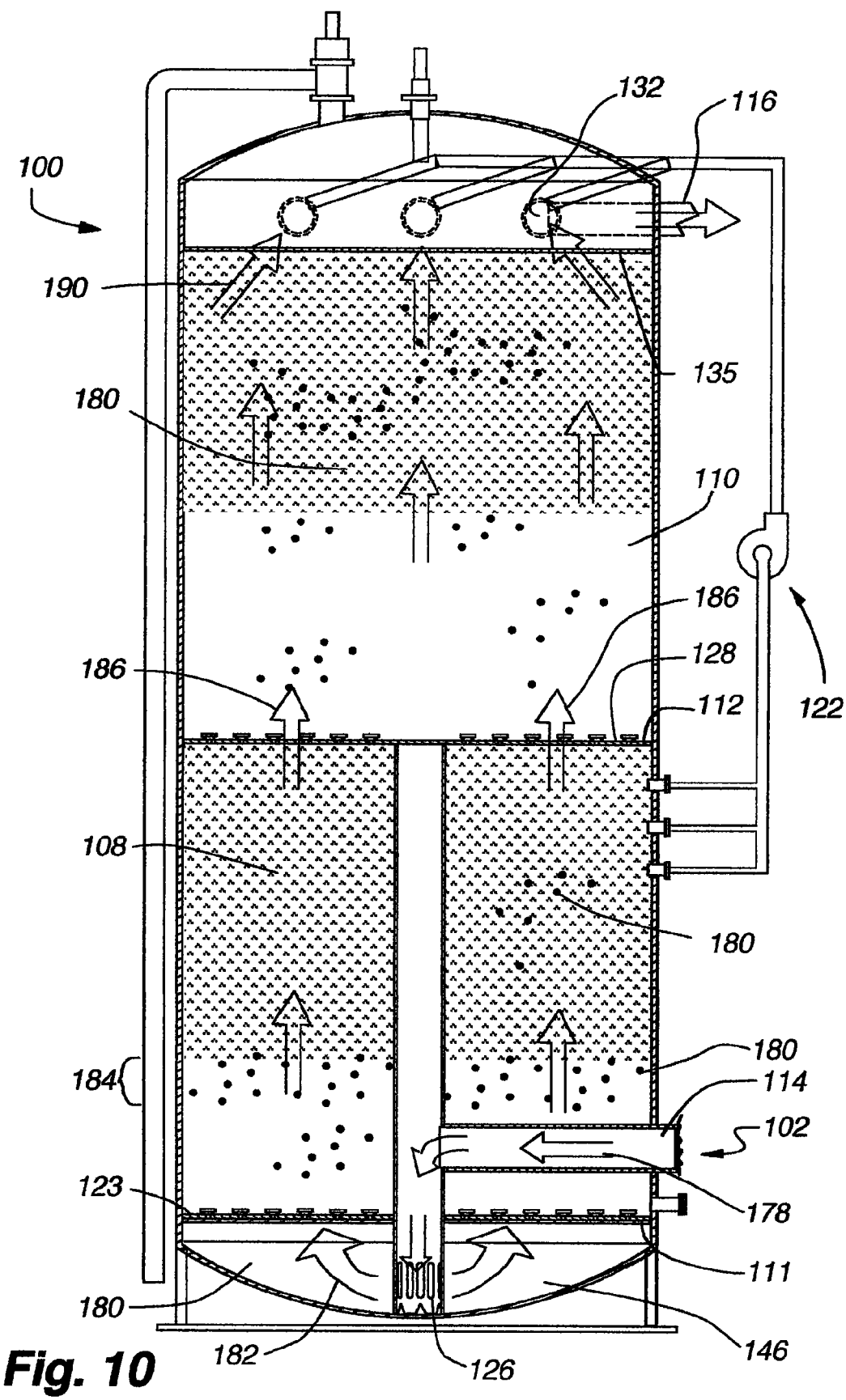
FIG. 10 illustrates a cross sectional view of normal up-flow of aqueous medium through a purging column having two vertically stacked compartments in accordance with one embodiment of the present invention.

FIGS. 10-13 provide illustrative cross-sectional views of an operating purging column 100 in accordance with methods of the present invention. Referring to FIG. 10, a normal purging column receives an aqueous medium source (illustrated by arrow 178) at an input end 102. Dependent on the source, a variable amount of suspended particulates 180 are within the aqueous medium, which can lead to clogging of the adsorption material 124 and resulting increase in back-pressure within the column 100. Note that the embodiment shown in FIGS. 10-13 provide stacked compartments 108, 110 of adsorption material for the aqueous medium to flow through, separated by divider 128 and screen 112. The aqueous medium flows through the inlet 114 and then enters a compartment 146 free of adsorption material via a distribution pipe 126 (see arrow 182). The flow of the aqueous medium causes the adsorption material to pack against the divider 128 and screen 112 in a first compartment 108. Target contaminates are removed out of the aqueous medium via adsorption onto the adsorption material, for example, uranium would be removed from the aqueous medium by binding to a strong-base anion exchange resin. Particulates 180 are generally trapped toward the bottom portion of the up-flow packed adsorption medium within the first compartment 108. The aqueous medium then flows through the divider 128 and into a second compartment 110 having a pre-determined amount of adsorption material 124 (see arrow 186).

Note that some amount of particulates 180 eventually enters into the second compartment 110 after navigating through the adsorption material 124 (although the particulates cause clogging during the process of moving through the adsorption material). The aqueous medium then flows through the second amount of adsorption material, which has been compacted against screen 135 located at the output end 104 of the column 100 (see arrow 190). The aqueous medium continues into the outlet pipes 132 and out the outlet 116. Again note that particulates 180 become trapped in the adsorption material 124 of the second compartment 110. Normal up-flow continues in this manner until an unacceptable back-pressure is reached or an unacceptably high level of particulates has accumulated in the column. Note that in an alternative embodiment normal upflow can continue for a set duration of time. The amount of time dependent on the history of clogging at the particular site or other like sites. In this manner, the present invention can be practiced on a column at a site for predetermined intervals of time, rather than predetermined levels of back pressure. Preferably, this predetermined interval of time is of short enough duration to keep the back pressure below the parameters discussed above.

When it is determined that a purging procedure of the present invention is necessary for continued operation of the column, the up-flow of the aqueous medium is stopped to allow the adsorption material and particulates to settle within each compartment.

Figure 11:
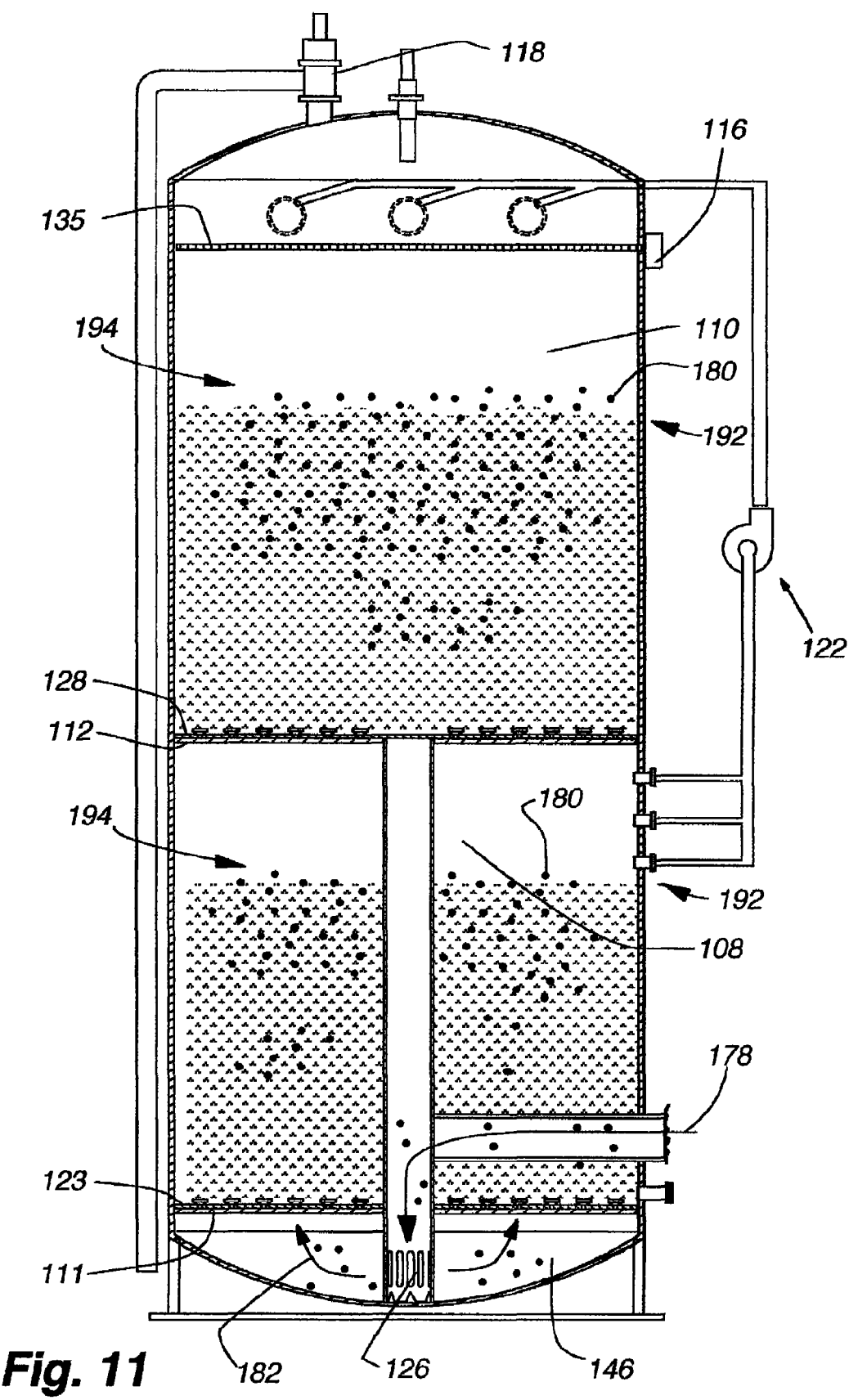
FIG. 11 illustrates a cross sectional view of stop-flow of aqueous medium in a purging column having two vertically stacked compartments in accordance with one embodiment of the present invention.

FIG. 11 shows a purging column 100 after the up-flow is stopped allowing the adsorption material 124 and particulates 180 to settle within the first 108 and second 110 compartments. Adsorption material 124 settles at a faster rate than the suspended particulates 180, facilitating particulate 180 movement toward the top end 192 of the adsorption material 124, and in some cases to be suspended above the adsorption material 194. Note that the heavy concentration of particulates at the bottom of the adsorption material in the first compartment has essentially been moved in a direction toward the top end 192 of the adsorption material within each compartment.

Figure 12:
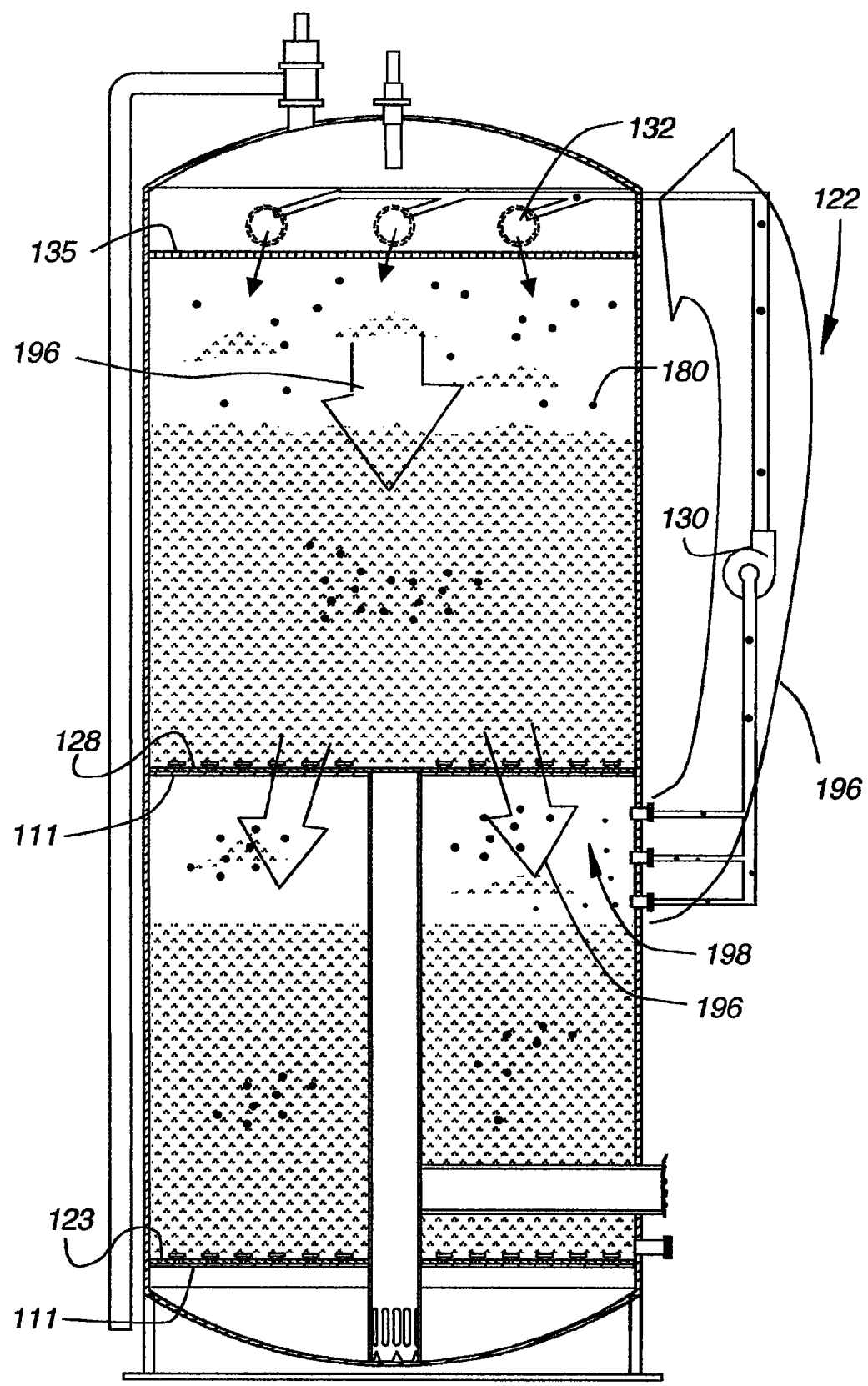
FIG. 12 illustrates a cross sectional view of a pulsed backflow of aqueous medium using a reverse loop in a purging column having two vertically stacked compartments in accordance with one embodiment of the present invention.

FIG. 12 shows the reverse flow (as shown by directional arrows 196) of the aqueous medium from the first compartment 108 into the second compartment 110 and back into the first compartment 108. The aqueous medium is moved from a zone 198 above the settled adsorption material in the first compartment 108 to the outlet pipes 132 above the adsorption material in the second compartment 110 and back to the first compartment 108 through screen 135 and the adsorption material constrained within the second compartment 110.

Particulates 180 suspended in the zone 198 above the adsorption material in the first compartment 108 generally are moved to the second compartment 110 and adsorption material in both compartments are agitated so as to allow suspended particulates 180 to move toward the top end of the adsorption material (via settling properties of the particulates within the aqueous medium). The reverse flow concentrates the particulates 180 toward the top end of the adsorption material 124 in each compartment, and especially in the second compartment 110. In addition, the reverse flow pushes adsorption material caught in screens 111, 112 and 135) back into their respective compartments, thereby serving as a screen cleaning step as well. Reverse flow pulses can last for an amount of time sufficient to disturb and move particulates 180 to the top end of the second compartment 110, but are generally about 10 seconds to 120 seconds in length. Typical reverse flow rate is about 10 to 90% flow rate of the normal up-flow rate, and preferably about ¼ of the up-flow rate. During a reverse flow pulse, the normal up-flow into the column remains stopped and a check valve located at the inlet is closed to prevent back-flow of the aqueous medium out of the column.

Figure 13:
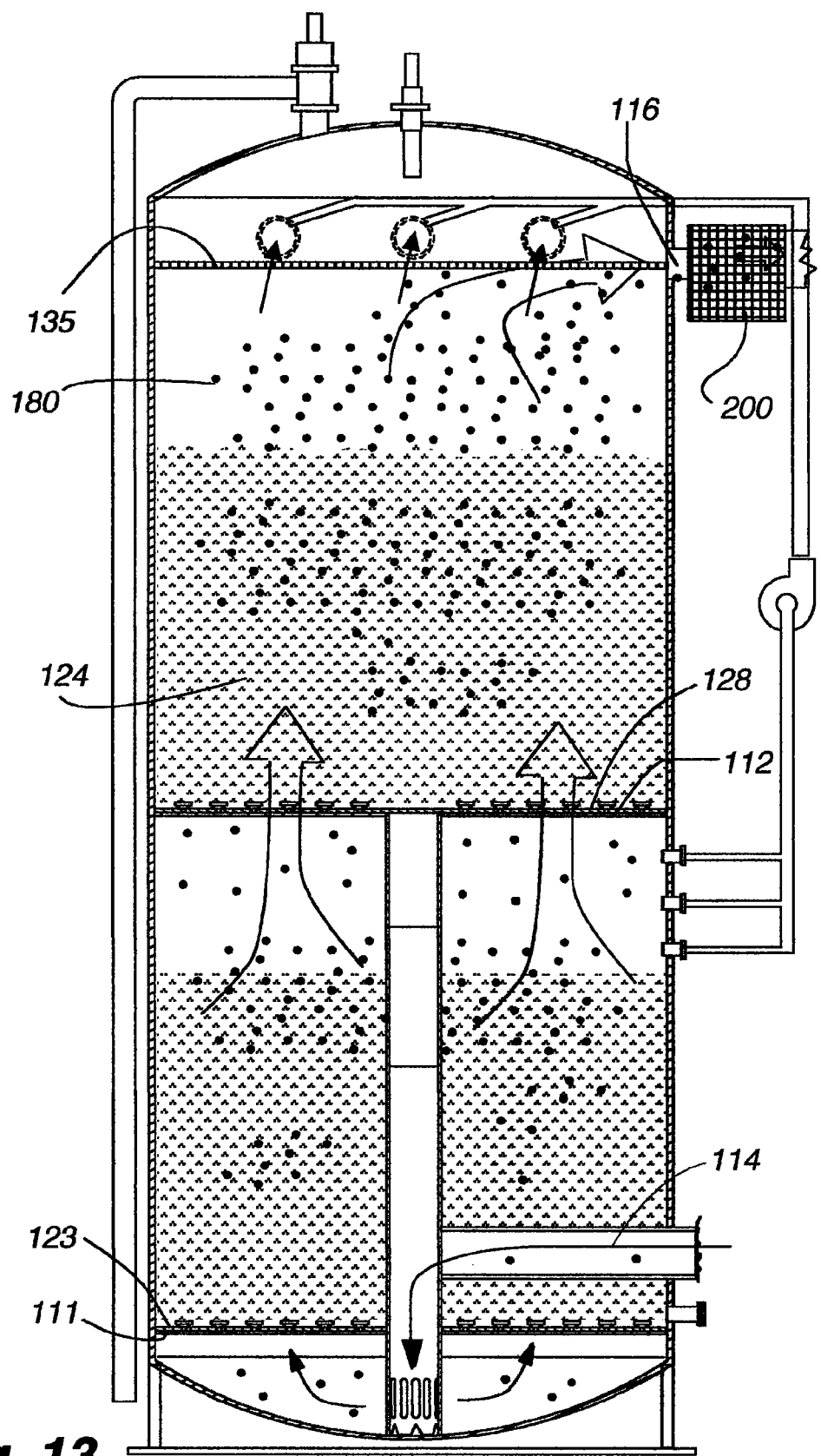
FIG. 13 illustrates a cross sectional view of re-start of normal up-flow of aqueous medium through a purging column having two vertically stacked compartments in accordance with one embodiment of the present invention.

FIG. 13 shows the resumption of normal up-flow through the purging column 100 once the stop and reverse flow of the aqueous medium is complete (see FIGS. 10-12). Note that portion of the particulates 180 previously caught in the adsorption material 124 are now able to exit the column 100 through an outlet 116 at the top end of the second compartment. Also note that particulates continue to enter the column via the inlet 114 and that not all particulates are moved through the system on any one purging procedure, rather the purging substantially reduces the number of particulates clogging the adsorption material.

In alternative embodiments, the outlet 116 of the purging column is fluidly connected to a filter 200 adapted for the removal of the particulates, although some embodiments envision that the particulates are simply released back into normal use of the aqueous medium or are dumped into a sewer or other like disposal site.

Further, and as previously described, resumption of upflow into the purging column can be performed using a "slow" start. Slow starts gradually move the adsorption material and particulates toward the outlet portion of the column, allowing the particulates, typically having slower settling rates, to move out of the column before the adsorption material becomes packed against the dividers in the upward direction. Typical slow starts are performed by running the aqueous medium through the column at from about 5% to 100% of the normal flow rate. The slow start typically last from about 1 to about 15 minutes in length or until the particulates in the upper compartment have had an opportunity to move out of the column.

System for Removing Contaminates from an Aqueous Medium

Embodiments of the present invention provide systems for the removal of contaminates from an aqueous medium. In one embodiment, a purging column(s) 100 of the present invention is connected to an aqueous medium source 202 and discharges the aqueous medium into a suitable discharge repository, for example a sewer or the like 204. The purging columns 100 can be connected in series (side-by-side or vertically stacked) or in parallel. A filter or filters 206 can be incorporated into the discharge stream to limit or eliminate particulates where appropriate.

Figure 14A:
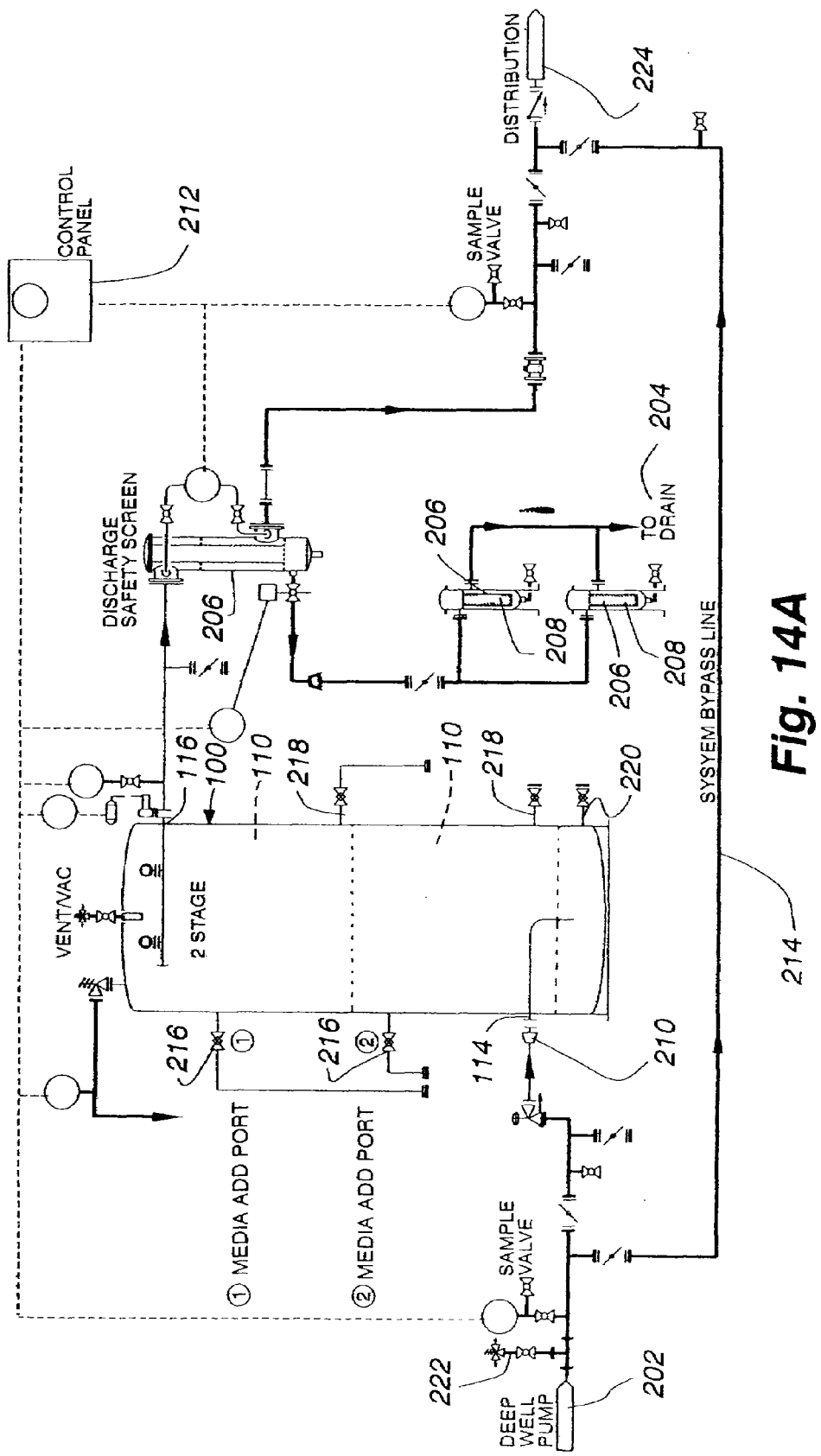
FIG. 14A is a schematic diagram showing one system embodiment in accordance with the present invention.
Figure 14B:
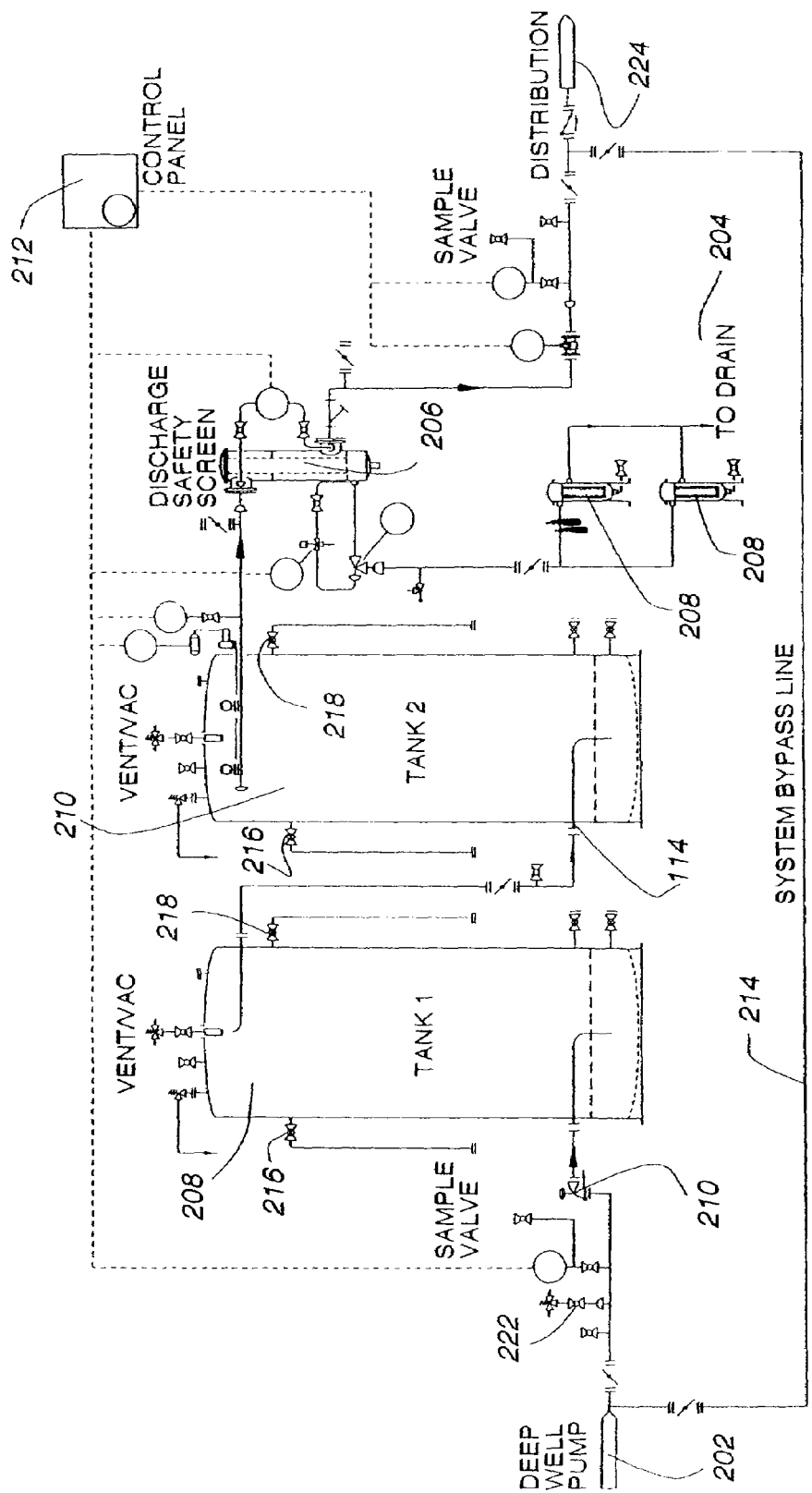
FIG. 14B is a schematic diagram showing an alternative system design embodiment in accordance with the present invention.

Referring to FIGS. 14A and 14B, a two compartment column 100 (vertically stacked) (14A), and in series (side-by-side 208, 210) (14B) are shown. With regard to FIG. 14A, the second compartment 110 of the column 100 does not have an upper screen, but rather, optional screens and filter connected to the column (the column may also have a screen integrated within the second compartment as shown in FIGS. 10-13).

Aqueous medium is received from a source 202, e.g., a deep well pump, and delivered to the column in an up-flow direction. Adsorption material is constrained within each of the two compartments 108, 110. Contaminates within the aqueous medium are substantially removed and the aqueous medium is discharged via screened or unscreened column outlet 116. A series of one or more safety filters 206 can receive the discharged aqueous medium for elimination of free adsorption material and/or particulates. A safety filter separates the filtered aqueous medium from the particulate containing discharge, with the filtered and treated aqueous medium going to a distribution 224. A bag filter 208 can then receive the particulate containing filtered aqueous medium to ensure the removal of most particulates and adsorption material from the treated aqueous medium.

A series of one or more check valves 210 can be utilized on the inlet 114 of the column to minimize back-flow out of the column, especially when the adsorption material within the column is undergoing a purge cycle using a reverse loop of the invention. A control panel 212 can monitor flow rate, back-pressure, feed and discharge levels of contaminate, safety filter condition, and when to take samples.

In one embodiment, as shown in FIGS. 14A and 14B, a portion of the released discharged aqueous medium is released into a drain, e.g., a sewer system 204. Filtered aqueous medium having minimal amounts of particulate or adsorption material is discharged back into a distribution pathway. Note that in some systems of the present invention, there is no drain, so the discharged aqueous medium can be pumped back to the column or can be pumped to a storage tank for later manual disposal (not shown). The systems of the present invention facilitate removal of particulate from the aqueous material and minimize the build-up of back-pressure within the system.

A system bypass 214 allows the systems of the present invention to be isolated for maintenance or where the process is not required, i.e., when the feed does not have a sufficient level of a contaminate to necessitate removal via the adsorption materials of the present invention. It is also noted that the column 100 has a series of adsorption material add 216 and removal 218 ports, as well as a column drain port 220. The system also includes a system air release 222 to minimize air within the distribution lines. Finally, as briefly noted above, treated and filtered aqueous medium is provided back to a distribution point 224.

Figure 15:
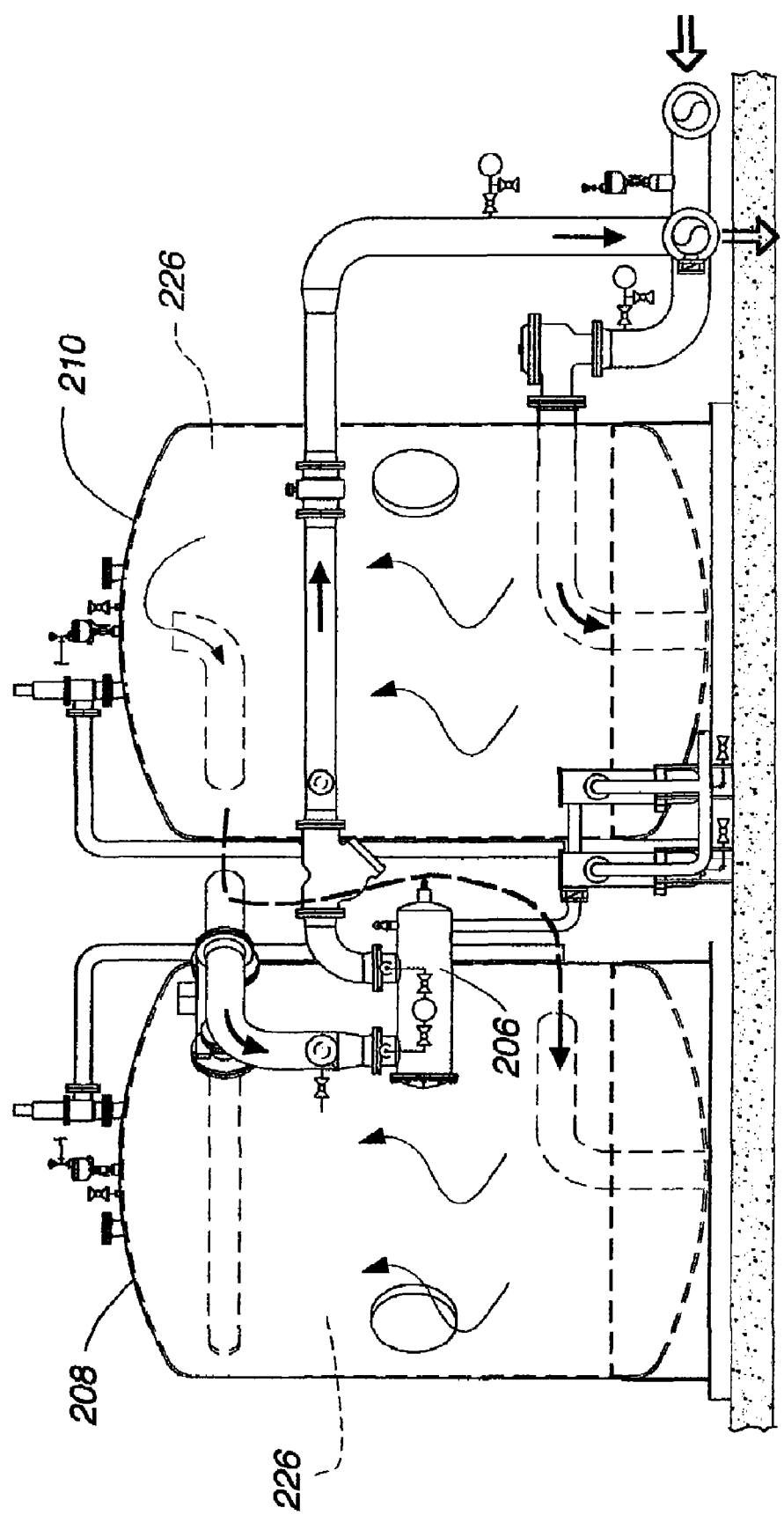
FIG. 15 is an illustrative perspective view of a two column system in accordance with an embodiment of the present invention.
Figure 16:
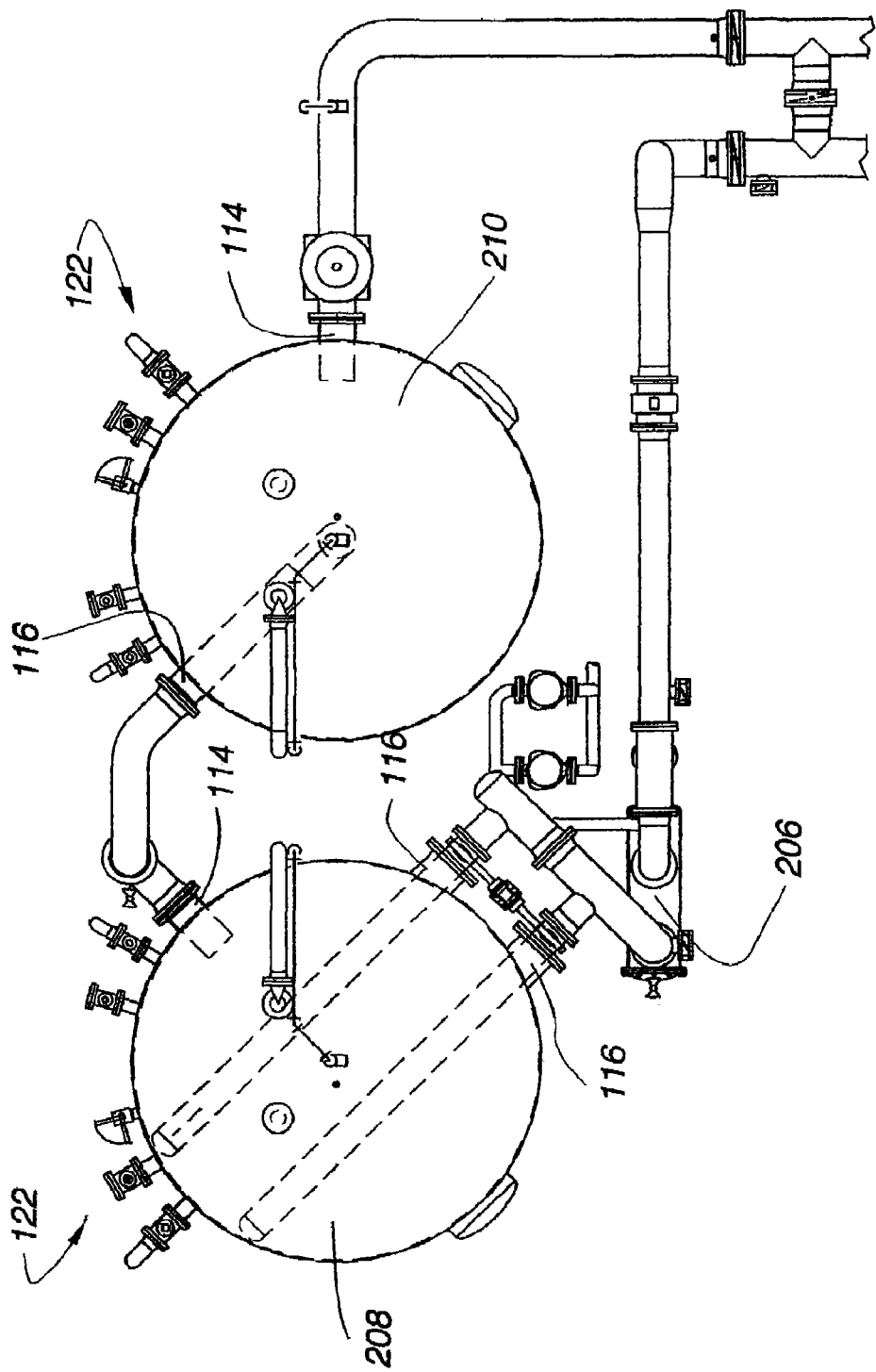
FIG. 16 is an illustrative top view of a two column system as shown in FIG. 15 in accordance with an embodiment of the present invention.

FIG. 15 provides a side view of a two column system in accordance with the present invention. Two purging columns 208, 210 are connected in series, each column having one compartment 226 for constraint of adsorption material. Note that each of the columns 208, 210 could include two or more compartments for constraint of separate portions of adsorption material, as is discussed in greater detail above. A reverse loop of the present invention can also be incorporated into each of the two columns (one compartment each) to enhance reduction of particulates from the adsorption material. In such instances, the reverse loop would operate as above for the two compartment column, but would move aqueous medium from just above the bed volume of adsorption medium, when the column is in a stop or stand-down status, to above the divider at the output end of the column, as described above. The principles involved in moving particulates from the input end of the column to the output end of the column would be the same. A filter between columns can be included. FIG. 16 shows a perspective top view of the two column system, including a top view of a reverse loop on each column.

Having generally described the invention, the same will be more readily understood by reference to the following examples, which are provided by way of illustration and are not intended as limiting.

EXAMPLES

Purging Column Limits Particulate Build-Up in Uranium Removal System

A uranium removal system was prepared for treatment of an aqueous medium source located in Dinwiddie, Va. The system was tested for the ability to treat and process a continuous flow of water for the removal of uranium. A pair of single stage, fluidized bed vessels rated for 150 pounds/in$^2$ operating pressure were provided to the Dinwiddie drinking water supply. The vessels were designed to handle: 80 gallons per minute (gpm), having approximately 80 ppb uranium, and an empty bed contact time of 3.7 minutes at a hydraulic loading rate of 8.3 gallons per minute per square foot. The vessels were connected to each other in series and both had an up-flow design, see FIGS. 1-8.

In general, the systems of the present Example include Schedule 10 304L stainless steel piping designed to permit feed, discharge and bypass piping connections into the distribution system. The pipe was flanged and welded as required for each connection.

A bypass pipe, and necessary valves, was included in the system to permit the allow for isolation of the uranium removal vessels from the Dinwiddie water supply. The system included feed and discharge valves, air-release valves, bypass valves, a hydraulically actuated slow-operating check valve, pressure relief valves and a containment filter. The containment filter was stainless steel and fitted with a replaceable filter element and differential pressure switch.

The system included a totalizing flow meter with a local display. The pressure gages were provided for system feed, treatment vessel discharge and system discharge. The pressure gage piping was NPT stainless steel and included a root valve for isolation.

The operation of the uranium removal system was fully automated and required little to no operator activity. For operation of the system of the current Example, the following operating sequence was followed:

1. The target deep well pump is started from the customer control system, causing water to flow the pipe network. Entrained air is bled through automatic vent valves.
2. Slow-operating check valve opens based on system hydraulic pressure, allowing water flow to enter the treatment vessels.
3. The adsorption material was expanded in an up-flow direction and uranium adsorbed to the adsorption material.
4. A flow meter records the number of gallons treated.
5. The contaminate filter was manually cleaned when required.
6. Purging methods of the present invention were performed periodically to facilitate flow through of particulates out of the constrained adsorption material.

Note that the NSF approval of the adsorption material was maintained under NSF Standard 61.

In more detail, an uranium removal system was installed having two up-flow tanks operated in series, each tank having approximately three feet of uranium removal adsorption material. The feed water, while low in suspended solids or particulates (2.5 NTU) contained sufficient particulates to cause plugging of the adsorption material over time. The capacity of the system was approximately eighty gallons per minute. Flow rates for the system were selected to achieve a semi-packed bed in the up-flow configuration at four to ten gallons per square foot per minute (actual design parameter is 8.3 gpm/ft$^2$). Embodiments of the present invention, including a reverse loop and a slow opening check valve were installed on each of the two tanks. A rinsing time of 45 seconds was set for the entirety of the run. In addition, approximately five stop and start-up procedures were performed each. Data in Table 1 illustrate the pressure and particulate amounts for the system over a period of about 250 days.

TABLE 1

| Day | Event | Feed Pressure | Discharge Pressure | Delta Pressure | Gallons Treated | ~pounds particulates in feed |
|-----|-------|---------------|--------------------|-----------------|-----------------|------------------------------|
| 1 | start | 59 | 61 | 2 | 10 | 0 |
| 20 | sample | 58 | 62 | 4 | 627,900 | 26 |
| 56 | sample | 60 | 62 | 2 | 1,481,500 | 61.4 |
| 84 | sample | 59 | 63 | 4 | 4,320,620 | 179 |
| 117 | sample | 60 | 62 | 2 | 5,030,400 | 209 |
| 231 | sample | 60 | 63 | 3 | 6,824,700 | 283 |

The data from the current example shows that over a 250 day period of running, little to no pressure built-up in the adsorption material and approximately 283 pounds of particulates were collected and removed out of the system. In this particular case the particulates were removed from the system into a filter and the filter material disposed of at an approved site. This provided a significant cost (no concentrated particulate disposal cost) and time (no shut down to back-wash the system) benefit It is understood for purposes of this disclosure, that various changes and modifications may be made to the invention that are well within the scope of the invention. Numerous other changes maybe made which will readily suggest themselves to those skilled in the art and which are encompassed in the spirit of the invention disclosed herein and defined in the appended claims.

The specification contains numerous citations to patents, patent applications, and publications, each is hereby incorporated by reference for all purposes.

What is claimed is:

1. A housing comprising:
    a compartment for constraining an adsorptive material, the compartment having an input end, a middle portion and an output end, wherein the compartment is adapted for an aqueous medium to flow through the input end, the middle portion and exit out the output end;
    a screen or other sieve device that covers the output end of the housing for preventing release of adsorptive materials out of the compartment with the aqueous medium; and
    a reverse loop adapted to receive and transport aqueous medium and adsorptive material from within the middle portion of the compartment and distribute to the output end of the compartment, wherein the aqueous medium and adsorptive material then re-circulates back to the middle portion of the compartment;
    wherein the housing is adapted to receive the aqueous medium at the input end and release aqueous medium through the output end and out an outlet in an up-flow direction and wherein the reverse loop is adapted to reverse the direction of flow within the housing to move the aqueous medium from the output end of the compartment and back toward the middle portion of the housing and thereby circulate the aqueous medium back to the outlet end to provide a purging of the adsorptive material.

2. The housing of claim 1 wherein the housing is a column having a diameter of at least 1 ft.

3. The housing of claim 1 wherein the adsorptive material is an anion exchange resin.

4. The housing of claim 1 wherein the reverse loop has one or more exterior pipes for moving the aqueous medium from the middle portion of the housing to the outlet end of the housing.

5. The housing of claim 4 wherein the reverse loop comprises a pump or other like device for moving the aqueous medium from the middle portion to the exterior pipes to the outlet end of the housing to establish the reverse circulation with the housing.

6. A system for removing a contaminate from aqueous medium, the system comprising:
    a housing having an internal volume for constraining an adsorptive material, the adsorptive material taking up a portion of the internal volume wherein the column is adapted to receive and expel the aqueous medium in an up-flow direction;
    a reversal loop operatively connected to the housing for purging the adsorptive material within the housing;
    a series of filters operatively connected to the housing for capturing expelled particulates and adsorptive material from the housing;
    wherein the particulates and adsorptive material are returned to the housing and the aqueous medium is discharged from the system as a treated aqueous medium.

7. The system of claim 6 further comprising a control panel for monitoring pressure within the housing and activating the reversal loop on the housing to facilitate the purging of the adsorptive material within the housing.

* * * * *